(12) United States Patent
Saito et al.

(10) Patent No.: US 10,778,028 B2
(45) Date of Patent: Sep. 15, 2020

(54) POWER INFORMATION MANAGEMENT SYSTEM, MANAGEMENT METHOD, COMPUTER-READABLE STORAGE MEDIUM, POWER INFORMATION MANAGEMENT SERVER, COMMUNICATION TERMINAL, AND POWER SYSTEM

(71) Applicant: HONDA MOTOR CO.,LTD., Tokyo (JP)

(72) Inventors: Hidekazu Saito, Saitama (JP); Ken Hanayama, Saitama (JP); Kanako Ikeda, Tokyo (JP); Daijiro Takizawa, Saitama (JP); Keiichi Iguchi, Tokyo (JP); Shuji Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/741,710

(22) Filed: Jan. 13, 2020

(65) Prior Publication Data
US 2020/0153254 A1    May 14, 2020

Related U.S. Application Data

(63) Continuation of application No. PCT/JP2019/011716, filed on Mar. 20, 2019.

(30) Foreign Application Priority Data

Mar. 20, 2018 (JP) ................................ 2018-052844

(51) Int. Cl.
*H02J 7/00* (2006.01)
*G06Q 50/06* (2012.01)
(Continued)

(52) U.S. Cl.
CPC ............. *H02J 7/007* (2013.01); *G06Q 50/06* (2013.01); *H02J 3/32* (2013.01); *B60L 53/65* (2019.02)

(58) Field of Classification Search
CPC .... H02J 7/007; H02J 3/32; H02J 13/00; H02J 3/00; G06Q 50/06; B60L 53/65
(Continued)

(56) References Cited

U.S. PATENT DOCUMENTS 9,114,721 B2 * 8/2015 Tsuda .................... G07C 5/008
2012/0249056 A1    10/2012 Ukita
(Continued)

FOREIGN PATENT DOCUMENTS

| JP | 2012210073 A | 10/2012 |
|----|--------------|---------|
| JP | 2014057495 A | 3/2014  |

OTHER PUBLICATIONS

International Search Report and (ISA/237) Written Opinion of the International Search Authority for International Patent Application No. PCT/JP2019/011716, dated Jun. 11, 2019.
(Continued)

*Primary Examiner* — M Baye Diao

(57) ABSTRACT

Disclosed is a power information management system including a supply information acquisition unit configured to acquire an amount of supplied power correlation correlating with an amount of externally-supplied power, which is an amount of power supplied to an external by a power supplier/demander having at least one of a power generation apparatus and a power storage apparatus; a receipt information acquisition unit configured to acquire an amount of received power correlation correlating with an amount of externally-received power, which is an amount of power received from an external by the power supplier/demander; and an available amount determination unit configured to
(Continued)

determine an amount of available power correlation that can be available by the power supplier/demander, the amount of available power correlation correlating with an amount of power that can be used, profited or disposed by the power supplier/demander.

19 Claims, 12 Drawing Sheets

(51) Int. Cl.
  *H02J 3/32* (2006.01)
  *B60L 53/65* (2019.01)
(58) Field of Classification Search
  USPC .......................................................... 320/128
  See application file for complete search history.

(56) References Cited

U.S. PATENT DOCUMENTS

| 2013/0067253 | A1* | 3/2013 | Tsuda | B60L 53/665 |
| | | | | 713/300 |
| 2018/0248403 | A1* | 8/2018 | Takashita | H02J 3/14 |
| 2020/0153254 | A1* | 5/2020 | Saito | H02J 3/00 |

OTHER PUBLICATIONS

Decision to Grant a Patent issued for counterpart Japanese Application No. 2019-542741, dated Oct. 8, 2019 (drafted on Sep. 30, 2019).

\* cited by examiner

| 800 | | | | | | | | |
|---|---|---|---|---|---|---|---|---|
| | 812 | 814 | 822 | 824 | 832 | 834 | 840 | 850 |
| | COMMUNITY ID | SUPPLIER/ DEMANDER ID | POWER TRANS- MISSION/ RECEPTION TIME | TIME PERIOD ID | AMOUNT OF POWER TRANSMIS- SION [kWh] | AMOUNT OF POWER RECEPTION [kWh] | POINT [pt] | SUPPLY REMAINING POWER [kW] |
| | .. | .. | .. | .. | .. | .. | .. | .. |
| | C_001 | U_001 | *** | P_101 | *** | - | *** | *** |
| | C_001 | U_001 | *** | P_101 | - | *** | *** | *** |
| | .. | .. | .. | .. | .. | .. | .. | .. |

| 922 | 924 | 930 | 940 AMOUNT OF POWER TRANSMISSION [kWh] | | | | 950 INCOME | |
|---|---|---|---|---|---|---|---|---|
| COMMUNITY ID | SUPPLIER/ DEMANDER ID | POWER TRANS- MISSION TIME | SUM | BREAKDOWN | | | AMOUNT OF MONEY | AMOUNT OF GIVEN POINTS |
| | | | | POWER SELLING | POINT CONVERSION | | | |
| .. | .. | .. | .. | .. | .. | | .. | .. |
| C_001 | U_001 | *** | *** | *** | *** | | *** | *** |
| .. | .. | .. | .. | .. | .. | | .. | .. |
| | | | 942 | 946 | 948 | 944 | 952 | 954 |

FIG. 10

| 1000 | 1022 | 1024 | 1030 | 1040 AMOUNT OF POWER RECEPTION [kWh] | | | 1050 EXPENDITURE | |
|---|---|---|---|---|---|---|---|---|
| | COMMUNITY ID | SUPPLIER/ DEMANDER ID | POWER RECEPTION TIME | 1042 SUM | 1044 BREAKDOWN | | 1052 AMOUNT OF MONEY | 1054 AMOUNT OF CONSUMED POINTS |
| | | | | | 1046 POWER PURCHASE | 1048 POINT CONVERSION | | |
| | ‥ | ‥ | ‥ | ‥ | ‥ | ‥ | ‥ | ‥ |
| | C_001 | U_001 | *** | *** | *** | *** | *** | *** |
| | ‥ | ‥ | ‥ | ‥ | ‥ | ‥ | ‥ | ‥ |

POWER INFORMATION MANAGEMENT SYSTEM, MANAGEMENT METHOD, COMPUTER-READABLE STORAGE MEDIUM, POWER INFORMATION MANAGEMENT SERVER, COMMUNICATION TERMINAL, AND POWER SYSTEM

CROSS REFERENCE TO RELATED APPLICATION

This is a continuation application of International Application No. PCT/JP2019/011716 filed on Mar. 20, 2019, which claims priority to Japanese Patent Application No. 2018-052844 filed in JP on Mar. 20, 2018, the contents of each of which are incorporated herein by reference.

BACKGROUND

1. Technical Field

The present invention relates to a power information management system, a management method, a computer-readable storage medium, a power information management server, a communication terminal, and a power system.

2. Related Art

A power management system configured to give a point to a power customer in correspondence to power, which is supplied to a power network by the power customer, is known (for example, refer to Patent Document 1).
Patent Document 1: Japanese Patent Application Publication No. 2014-057495

BRIEF DESCRIPTION OF THE DRAWINGS

FIG. 8 schematically shows an example of a data table 800.
FIG. 9 schematically shows an example of the data table 900.
FIG. 10 schematically shows an example of the data table 1000.

DESCRIPTION OF EXEMPLARY EMBODIMENTS

Figure 1:
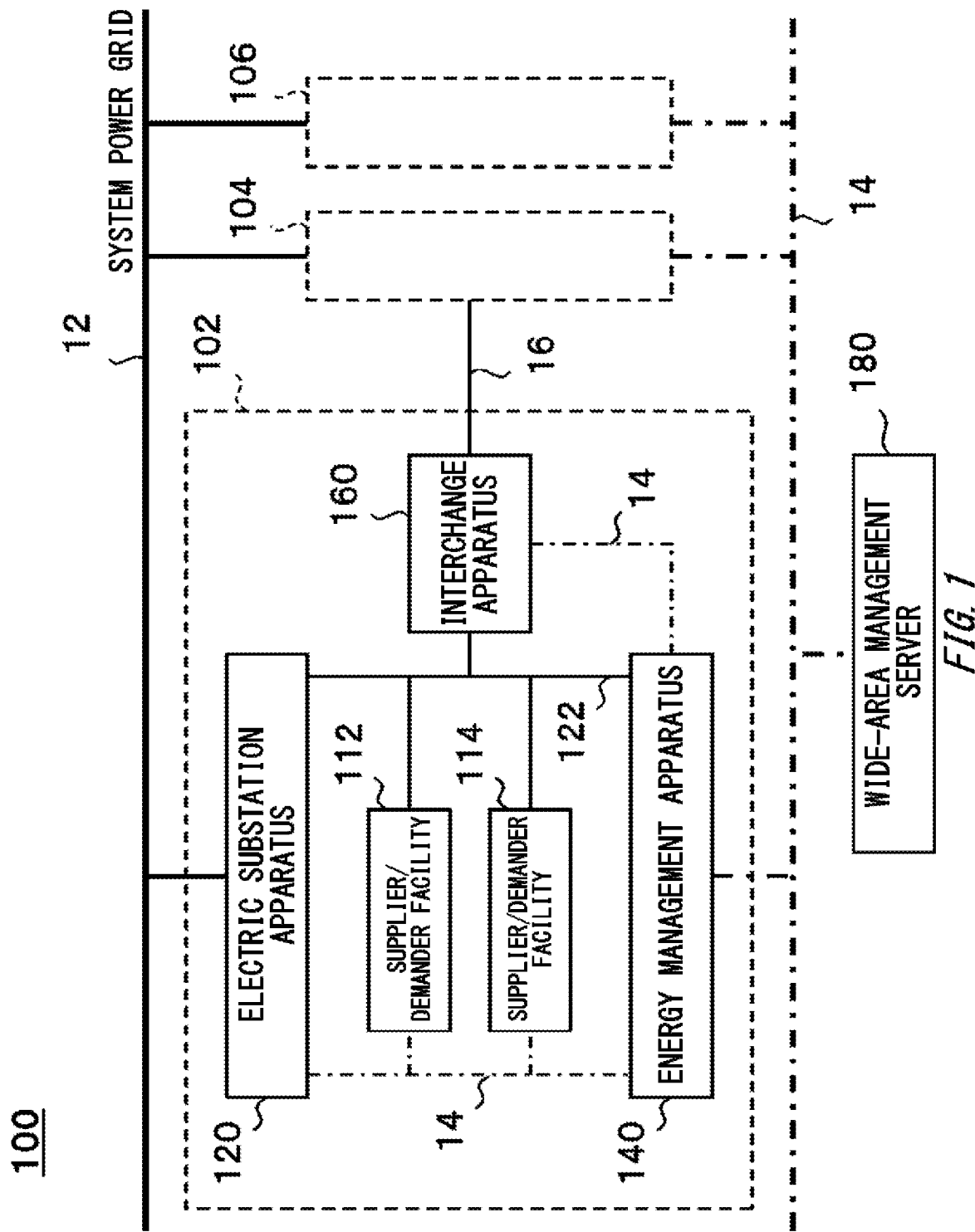
FIG. 1 schematically shows an example of a system configuration of an energy management system 100.

Hereinbelow, embodiments of the present invention will be described. However, the embodiments do not limit the invention defined in the claims. Also, all combinations of features described in the embodiments are not necessarily essential to solving means of the invention. In the drawings, the same or similar parts are denoted with the same reference signs, and the overlapping descriptions thereof are omitted in some cases.

[Outline of Energy Management System 100]

FIG. 1 schematically shows an example of a system configuration of an energy management system 100. In the present embodiment, the energy management system 100 includes a plurality of devices (which may also be simply referred to as 'community 102') configuring a community 102, a plurality of devices (which may also be simply referred to as 'community 104') configuring a community 104, and a plurality of devices (which may also be simply referred to as 'community 106') configuring a community 106. The energy management system 100 may include a wide-area management server 180.

In the present embodiment, the community 102 includes a supplier/demander facility 112, a supplier/demander facility 114, an electric substation apparatus 120, a power transmission and distribution grid 122, an energy management apparatus 140, and an interchange apparatus 160. The plurality of devices configuring the community 102 may be configured to transmit and receive information each other via a communication network 14. The energy management apparatus 140 of the community 102 may be configured to transmit and receive information to and from the other communities via the communication network 14. The energy management apparatus 140 of the community 102 may be configured to transmit and receive information to and from the wide-area management server 180 via the communication network 14.

In the present embodiment, the community 104 and the community 106 have configurations similar to the community 102, except that the interchange apparatus 160 is not provided. In the present embodiment, for simple descriptions, the case in which the energy management system 100 includes the community 102, the community 104 and the community 106 is described. However, the number of the communities included in the energy management system 100 is not limited to the present embodiment. In another embodiment, the energy management system 100 may include one or multiple (which may also be referred to as 'one or more') communities.

The energy management system 100 may include one or more communities 102. The energy management system 100 may include one or more communities 104. The energy management system 100 may include one or more communities 106. The energy management system 100 may not include the community 102. The energy management system 100 may not include the community 104. The energy management system 100 may not include the community 106.

In the present embodiment, for simple descriptions, a case in which the community 102 includes the supplier/demander facility 112 and the supplier/demander facility 114 is described. However, the number of the supplier/demander facilities included in the community 102 is not limited to the present embodiment. In another embodiment, the community 102 may include three or more supplier/demander facilities.

A system power grid 12 may be an example of a power grid. The energy management system 100 may be an example of a power information management system and a power system. The community 102 may be an example of the power information management system and the power system. The community 104 may be an example of the power information management system and the power system. The community 106 may be an example of the power information management system and the power system. The supplier/demander facility 112 may be an example of a power supplier/demander. The supplier/demander facility 114 may be an example of the power supplier/demander. The supplier/demander facility 112 and the supplier/demander facility 114 may be an example of one or more power suppliers/demanders. The power transmission and distribution grid 122 may be an example of a power grid. The power transmission and distribution grid 122 may be an example of an outside of the supplier/demander facility 112 and the supplier/demander facility 114. The energy management apparatus 140 may be an example of the power information management system and the power system.

In the present embodiment, the power transmission and distribution grid 122 of the community 102 is electrically connected to the system power grid 12 via the electric substation apparatus 120. Also, the power transmission and distribution grid 122 of the community 102 is electrically connected to a self-owned line 16 via the interchange apparatus 160. In the present embodiment, the power transmission and distribution grid 122 of the community 104 is electrically connected to the system power grid 12 via the electric substation apparatus 120. Also, the power transmission and distribution grid 122 of the community 104 is electrically connected to the self-owned line 16, and is electrically connected to the interchange apparatus 160 of the community 102 via the self-owned line 16. In the present embodiment, the power transmission and distribution grid 122 of the community 106 is electrically connected to the system power grid 12 via the electric substation apparatus 120.

According to the present embodiment, the community 102 and the community 104 can interchange power indirectly via the system power grid 12. Also, the community 102 and the community 104 can interchange power via the self-owned line 16. The community 102 and the community 106 can interchange power indirectly via the system power grid 12. The community 104 and the community 106 can interchange power indirectly via the system power grid 12.

As used herein, the configuration "an element A and an element B are electrically connected" is not limited to a case in which the element A and the element B are physically connected. For example, an input winding and an output winding of a transformer are not physically connected to each other but are electrically connected. Also, a component for electrically connecting the element A and the element B may be interposed between the element A and the element B. As the component, a conductor, a switch, a transformer and the like may be exemplified.

In the present embodiment, the system power grid 12 is electrically connected to a commercial power supply. The system power grid 12 may be a power system provided by a power business operator or a power transmission business operator. The system power grid 12 may include power systems of a plurality of power business operators or a plurality of power transmission business operators. The power system may be a system in which power generation, electric substation, power transmission and power distribution are integrated.

In the present embodiment, the communication network 14 may be a wired communication transmission path, a wireless communication transmission path or a combination of a wired communication transmission path and a wireless communication transmission path. The communication network 14 may include a wireless packet communication network, the Internet, a P2P network, a dedicated line, VPN, a power line communication line, and the like. The communication network 14 may include (i) a mobile communication network such as a mobile telephone network and (ii) a wireless communication network such as wireless MAN (for example, WiMAX (registered trademark)), wireless LAN (for example, WiFi (registered trademark)), Bluetooth (registered trademark), Zigbee (registered trademark), NFC (Near Field Communication) and the like.

In the present embodiment, each of the community 102, the community 104 and the community 106 may be a group consisting of a plurality of suppliers/demanders. Members of each community share interests as to energy supply/demand, for example. Each of the plurality of suppliers/demanders possesses, occupies or uses a supplier/demander facility (for example, the supplier/demander facility 112, the supplier/demander facility 114 and the like). Some of the plurality of suppliers/demanders may be power retailers. Each of the plurality of suppliers/demanders may be an example of a user of the energy management system 100. The member of the community 102 may be an example of a user who uses the energy management system 100. The supplier/demander facility 112 and the supplier/demander facility 114 will be described in detail later.

In the present embodiment, the electric substation apparatus 120 is configured to control power distribution between the system power grid 12, and the power transmission and distribution grid 122. Operations of the electric substation apparatus 120 may be controlled by the energy management apparatus 140.

In one embodiment, the electric substation apparatus 120 is configured to receive high-voltage power of the system power grid 12, and to convert at least one of a voltage and a frequency of the electricity. The electric substation apparatus 120 is configured to distribute the electricity after the conversion to the power transmission and distribution grid 122. In another embodiment, the electric substation apparatus 120 is configured to receive low-voltage power of the power transmission and distribution grid 122, and to convert at least one of a voltage and a frequency of the electricity. The electric substation apparatus 120 is configured to distribute the electricity after the conversion to the system power grid 12 (which may also be referred to as reverse power flow). Also, in another embodiment, the electric substation apparatus 120 is configured to switch an electrical connection relation between the system power grid 12 and the power transmission and distribution grid 122. Thereby, for example, a state in which the power transmission and distribution grid 122 is disconnected from the system power grid 12 and a state in which the power transmission and distribution grid 122 is connected to the system power grid 12 can be switched.

In the present embodiment, the power transmission and distribution grid 122 is configured to distribute electricity among the plurality of devices configuring the community 102. A part of the power transmission and distribution grid 122 may be a power grid that is possessed or managed by a possessor, a manager or an operator of the system power grid 12. At least a part of the power transmission and distribution grid 122 may be a power grid that is possessed or managed by the community 102.

In the present embodiment, the energy management apparatus 140 is configured to manage the energy that is used in the community 102. For example, the energy management apparatus 140 manages demand and supply of the energy that is used in the community 102. As the energy, electricity, gas, hydrogen, heat and the like may be exemplified.

In the present embodiment, the energy management apparatus 140 is configured to manage power that is used in the community 102. For example, the energy management apparatus 140 manages stability and quality of power that is supplied via the power transmission and distribution grid 122. The energy management apparatus 140 may be configured to manage a power supply/demand of the community 102. For example, the energy management apparatus 140 manages power transmission and reception between the power transmission and distribution grid 122 and each of the supplier/demander facility 112 and the supplier/demander facility 114, for example.

The energy management apparatus 140 may be configured to monitor a state of a power supply/demand of the community 102, and to adjust excess and deficiency of electricity to flow through the power transmission and distribution grid 122. In the present embodiment, the energy management apparatus 140 may be configured to aggregate or adjust power supplies/demands of a plurality of supplier/demander facilities. An apparatus configured to aggregate or adjust power supplies/demands of the plurality of supplier/demander facilities may also be referred to as 'aggregator'.

In the present embodiment, for simple descriptions, the energy management system 100 and the energy management apparatus 140 will be described in detail with reference to an example in which the energy management apparatus 140 is configured to manage power to be used in the community 102. However, the energy management system 100 and the energy management apparatus 140 are not limited to the present embodiment. In another embodiment, the energy management apparatus 140 may be configured to manage energy other than the power.

The energy management apparatus 140 may be configured to output, as a command to the electric substation apparatus 120, a command for switching an electrical connection relation between the system power grid 12 and the power transmission and distribution grid 122 to the electric substation apparatus 120. Thereby, the energy management apparatus 140 can switch a state in which the power transmission and distribution grid 122 is disconnected from the system power grid 12 and a state in which the power transmission and distribution grid 122 is connected to the system power grid 12. The energy management apparatus 140 will be described in detail later.

In the present embodiment, the interchange apparatus 160 is configured to interchange power between the community 102 and the community 104. The interchange apparatus 160 may be configured to interchange power between the community 102 and the community 104 without via the system power grid 12. The interchange apparatus 160 will be described in detail later.

In the present embodiment, the wide-area management server 180 is configured to manage stability and quality of power that is to be supplied via the system power grid 12. The wide-area management server 180 may be configured to manage a power supply/demand of the system power grid 12. For example, the wide-area management server 180 manages power transmission and reception between the system power grid 12 and each of the community 102, the community 104 and the community 106. The wide-area management server 180 may be configured to manage (i) power transmission from the system power grid 12 to each of the community 102, the community 104 and the community 106, and (ii) power transmission from each of the community 102, the community 104 and the community 106 to the system power grid 12. The wide-area management server 180 may be configured to monitor a state of the power supply/demand of the system power grid 12, and to adjust excess and deficiency of electricity to flow through the system power grid 12.

[Specific Configurations of Respective Units of Energy Management System 100]

The respective units of the energy management system 100 may be implemented by hardware, software or a combination of the hardware and the software. At least some of the respective units of the energy management system 100 may be implemented by a single server or a plurality of servers. At least some of the respective units of the energy management system 100 may be implemented on a virtual machine or a cloud system. At least some of the respective units of the energy management system 100 may be implemented by a computer or a mobile terminal. As the mobile terminal, a mobile phone, a smart phone, a PDA, a tablet, a laptop computer, a wearable computer and the like are exemplified. The respective units of the energy management system 100 may be configured to store information by using a distributed ledger technology such as a block chair or a distributed network.

In a case in which at least some of the constitutional elements configuring the energy management system 100 are implemented by software, the constitutional element to be implemented by the software may be implemented by activating a program, in which operations relating to the constitutional element are prescribed, in an information processing device having a general configuration. The information processing device includes, for example, (i) a data processing device including a processor such as a CPU, a GPU and the like, a ROM, a RAM, a communication interface, and the like, (ii) an input device such as a keyboard, a touch panel, a camera, a microphone, various types of sensors, a GPS receiver, and the like, (iii) an output device such as a display device, a speaker, a vibration device and the like, and (iv) a storage device (including an external storage device) such as a memory, an HDD and the like. In the information processing device, the data processing device or storage device may be configured to store a program. The program may be stored in a non-transitory, computer-readable recording medium. The program is executed by the processor, thereby causing the information processing device to execute the operations prescribed by the program.

The program may be stored in a computer-readable medium such as a CD-ROM, a DVD-ROM, a memory, a hard disk and the like, or may be stored in a storage device connected to a network. The program may be installed into a computer configuring at least a part of the energy management system 100 from a computer-readable medium or a storage device connected to a network. The program may be executed to cause the computer to function as at least a part of the energy management system 100. The program for causing the computer to function as at least a part of the energy management system 100 may have a module in which operations of the respective units of the energy management system 100 are prescribed. The program or the module is configured to activate the data processing device, the input device, the output device, the storage device and the like to cause the computer to function as the respective units of the energy management system 100 or to cause the computer to execute an information processing method in the respective units of the energy management system 100. The information processing described in the program functions as a specific means in which software relating to the program and various types of hardware resources of the energy management system 100 cooperate with each other, as the program is read into the computer. The specific means implements calculation or processing of information according to a use purpose of the computer of the present embodiment, so that the energy management system 100 is established according to the use purpose.

[Outline of Respective Units of Supplier/Demander Facility]

Figure 2:
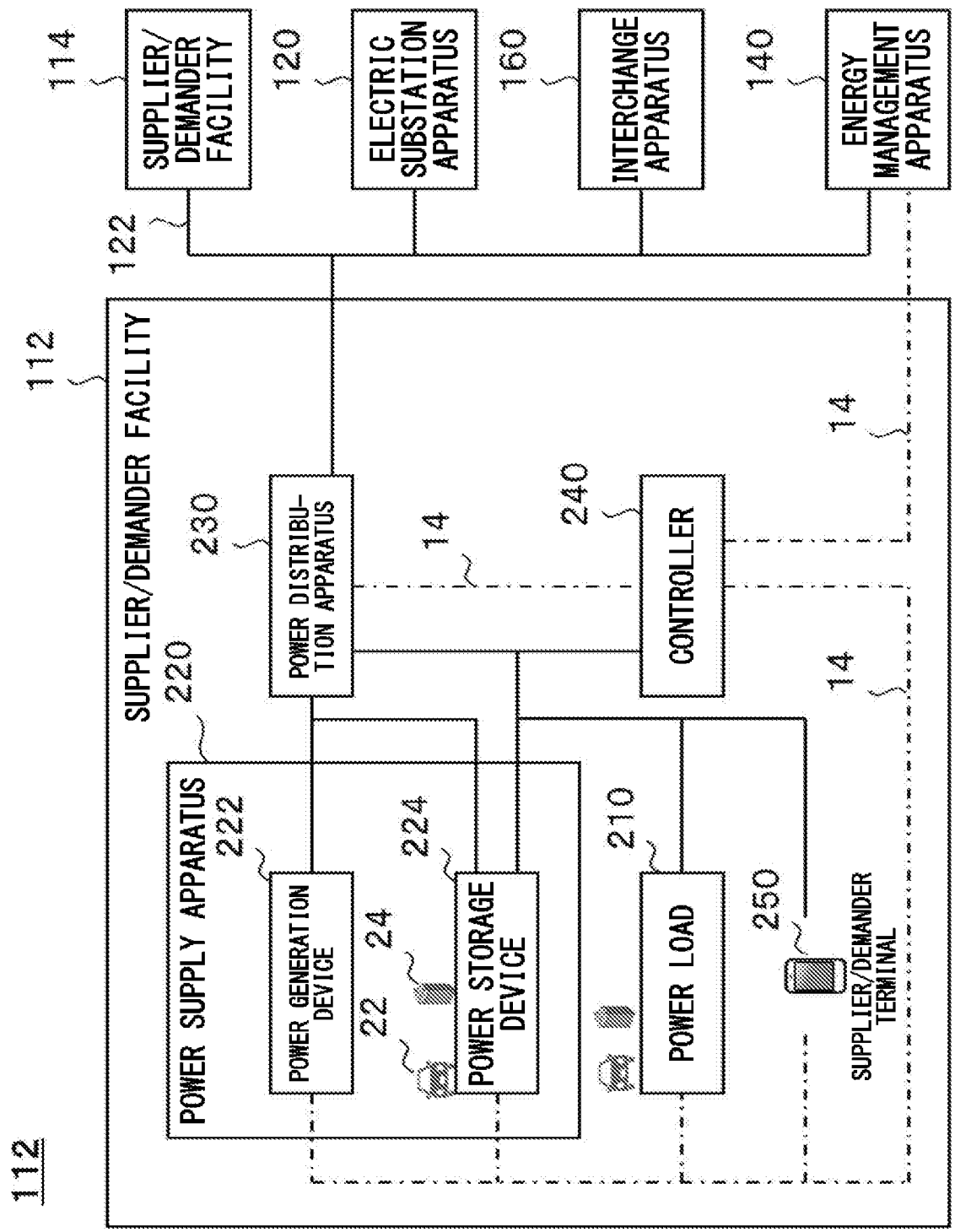
FIG. 2 schematically shows an example of an internal configuration of a supplier/demander facility 112.

FIG. 2 schematically shows an example of an internal configuration of the supplier/demander facility 112. In the present embodiment, the supplier/demander facility 112 includes one or more power loads 210, and a power supply apparatus 220. The supplier/demander facility 112 may include a power distribution apparatus 230, a controller 240, and one or more supplier/demander terminals 250. In the present embodiment, the power supply apparatus 220 includes one or more power generation devices 222, and one or more power storage devices 224. In the meantime, the supplier/demander facility 112 may not include at least one of the constitutional elements. In one embodiment, the supplier/demander facility 112 may not include the power supply apparatus 220. In another embodiment, the supplier/demander facility 112 may not include one of the power generation device 222 and the power storage device 224. In another embodiment, the supplier/demander facility 112 may not include the supplier/demander terminal 250. In the meantime, the supplier/demander facility 114 may have a similar configuration to the supplier/demander facility 112.

For the supplier/demander facility 112, the power storage device 224 of the supplier/demander facility 114 may be an example of an external power storage apparatus. Likewise, for the supplier/demander facility 114, the power storage device 224 of the supplier/demander facility 112 may be an example of an external power storage apparatus. A plurality of the power supply apparatuses 220 electrically connected via the power transmission and distribution grid 122 may be an example of a power supply system. The power distribution apparatus 230 may be an example of a receipt permission unit and a power transmission/reception control unit. The controller 240 may be an example of a request acquisition unit, a receipt permission unit and a power transmission/reception control unit. For the supplier/demander facility 112, the controller 240 of the supplier/demander facility 114 may be an example of a supply/demand situation acquisition unit. Likewise, for the supplier/demander facility 114, the controller 240 of the supplier/demander facility 112 may be an example of a supply/demand situation acquisition unit. The supplier/demander terminal 250 may be an example of a request acquisition unit and a communication terminal.

In the present embodiment, the power load 210 is configured to use electricity. The power load 210 may be an electric device configured to consume power. The power load 210 may be a charging device configured to charge an electric automobile 22, a portable storage battery 24, the supplier/demander terminal 250 and the like. At least some of operations of the power load 210 may be controlled by the controller 240. The electric automobile 22 includes a storage battery. The portable storage battery 24 may be an example of a mobile device including a storage battery.

In the present embodiment, the power supply apparatus 220 is configured to supply power to the other devices. The power that is supplied by the power supply apparatus 220 of the supplier/demander facility 112 (i) may be used in the supplier/demander facility 112, (ii) may be supplied to an outside of the supplier/demander facility 112 via the power distribution apparatus 230 of the supplier/demander facility 112, and (iii) may be supplied to an outside of the community 102 via at least one of the electric substation apparatus 120 and the interchange apparatus 160 of the community 102. Operations of the power supply apparatus 220 may be controlled by the controller 240.

In the present embodiment, the power generation device 222 is configured to generate electricity. As the power generation device 222, (i) a power generation device capable of using renewable energy, such as a solar power generation device, a wind-power generation device, and a hydropower generation device, (ii) a fuel cell, (iii) a cogeneration system, (iv) a tri-generation system and the like may be exemplified.

In the present embodiment, the power storage device 224 is configured to accumulate electricity. The power storage device 224 may be configured (i) to accumulate electricity generated by the power generation device 222 of the supplier/demander facility 112, and (ii) to accumulate electricity supplied from an outside of the supplier/demander facility 112. In the present embodiment, the power storage device 224 is configured to supply power to the other devices. The power that is supplied by the power storage device 224 of the supplier/demander facility 112 (i) may be used in the supplier/demander facility 112, (ii) may be supplied to the outside of the supplier/demander facility 112 via the power distribution apparatus 230 of the supplier/demander facility 112, and (iii) may be supplied to the outside of the community 102 via at least one of the electric substation apparatus 120 and the interchange apparatus 160 of the community 102.

In the present embodiment, the power storage device 224 may include (i) a fixed or stationary power storage apparatus, (ii) the electric automobile 22, (iii) the portable storage battery 24, and the like. When the electric automobile 22 or the portable storage battery 24 is electrically connected to the power supply apparatus 220, at least one of a dischargeable amount (also referred to as 'remaining amount') and a chargeable amount of the power storage device 224 increases. When the electrical connection relation between the electric automobile 22 or the portable storage battery 24 and the power supply apparatus 220 is disconnected, at least one of the dischargeable amount (also referred to as 'remaining amount') and the chargeable amount of the power storage device 224 decreases.

In the present embodiment, the power distribution apparatus 230 is configured to control power distribution between the power transmission and distribution grid 122 and an internal wiring of the supplier/demander facility 112. Operations of the power distribution apparatus 230 may be controlled by the controller 240.

In one embodiment, the power distribution apparatus 230 is configured to receive power from the power transmission and distribution grid 122. The power distribution apparatus 230 is configured to supply power to an electric device disposed in the supplier/demander facility 112. The power distribution apparatus 230 may be configured to adjust at least one of a voltage and a frequency of electricity that is to be supplied to the electric device disposed in the supplier/demander facility 112. The power distribution apparatus 230 may be configured to convert alternating current into direct current or direct current into alternating current.

In another embodiment, the power distribution apparatus 230 is configured to receive power from the power supply apparatus 220 of the supplier/demander facility 112. The power distribution apparatus 230 is configured to supply power to the power transmission and distribution grid 122. The power distribution apparatus 230 may be configured to adjust at least one of a voltage and a frequency of electricity that is to be supplied to the power transmission and distribution grid 122. The power distribution apparatus 230 may be configured to convert alternating current into direct current or direct current into alternating current.

Also, in another embodiment, the power distribution apparatus 230 is configured to control an amount of current that is to be supplied into the supplier/demander facility 112. The power distribution apparatus 230 may be configured to switch an electrical connection relation between the power transmission and distribution grid 122 and the internal wiring of the supplier/demander facility 112. For example, the power distribution apparatus 230 has a breaker, and breaks current when a value of the current flowing through the power distribution apparatus 230 exceeds any threshold value. The threshold value may be set at any timing by the controller 240.

In the present embodiment, the power distribution apparatus 230 may be configured to measure at least one of an instantaneous power [kW] and an amount of power [kWh] of electricity supplied to the electric device disposed in the supplier/demander facility 112. The power distribution apparatus 230 may be configured to measure at least one of an instantaneous power [kW] and an amount of power [kWh] of electricity supplied to the power transmission and distribution grid 122. The power distribution apparatus 230 may include one or more voltmeters. The power distribution apparatus 230 may be configured to output information indicative of at least one of the measured instantaneous power [kW] and amount of power [kWh] to the controller 240. The power distribution apparatus 230 and the controller 240 may be configured to transmit and receive information via the communication network 14.

In the present embodiment, the controller 240 is configured to control at least a part of devices disposed in the supplier/demander facility 112. The controller 240 may be configured to monitor a state of at least a part of the devices disposed in the supplier/demander facility 112. The controller 240 may be configured to transmit and receive information to and from each device via the communication network 14. The controller 240 will be described in detail later.

In the present embodiment, the controller 240 may execute a variety of information processing in cooperation with the energy management apparatus 140, in some cases. However, sharing of information processing to be executed in the energy management apparatus 140 and information processing to be executed in the controller 240 is not limited to the present embodiment. In another embodiment, the controller 240 may be configured to execute a part of the information processing in the energy management apparatus 140 of the present embodiment, and the energy management apparatus 140 may be configured to execute a part of the information processing in the controller 240 of the present embodiment.

The controller 240 may be implemented by hardware, software or a combination of the hardware and the software. In a case in which at least some of the constitutional elements configuring the controller 240 are implemented by software, the constitutional element to be implemented by the software may be implemented by activating a program, in which operations relating to the constitutional element are prescribed, in an information processing device having a general configuration.

The information processing device includes, for example, (i) a data processing device including a processor such as a CPU and a GPU, a ROM, a RAM, and a communication interface (ii) an input device such as a keyboard, a touch panel, a camera, a microphone, various types of sensors, and a GPS receiver, (iii) an output device such as a display device, a speaker, and a vibration device and (iv) a storage device (including an external storage device) such as a memory and an HDD. In the information processing device, the data processing device or storage device may be configured to store a program. The program may be stored in a non-transitory, computer-readable recording medium. The program is executed by the processor, thereby causing the information processing device to execute the operations prescribed by the program. The program may be a program for causing the computer to execute one or more sequences relating to a variety of information processing in the controller 240.

In the present embodiment, the supplier/demander terminal 250 is a communication terminal that is to be used by a user of the supplier/demander facility 112, and is not particularly limited. As the supplier/demander terminal 250, a personal computer, a mobile terminal and the like may be exemplified. As the mobile terminal, a mobile phone, a smart phone, a PDA, a tablet, a laptop computer, a wearable computer and the like may be exemplified. The supplier/demander terminal 250 may be used as a user interface of the controller 240. The supplier/demander terminal 250 may be an example of the power load 210.

In one embodiment, the supplier/demander terminal 250 is configured to transmit and receive information to and from the controller 240 via the communication network 14. In another embodiment, the supplier/demander terminal 250 is configured to transmit and receive information to and from the energy management apparatus 140 via the communication network 14.

Figure 3:
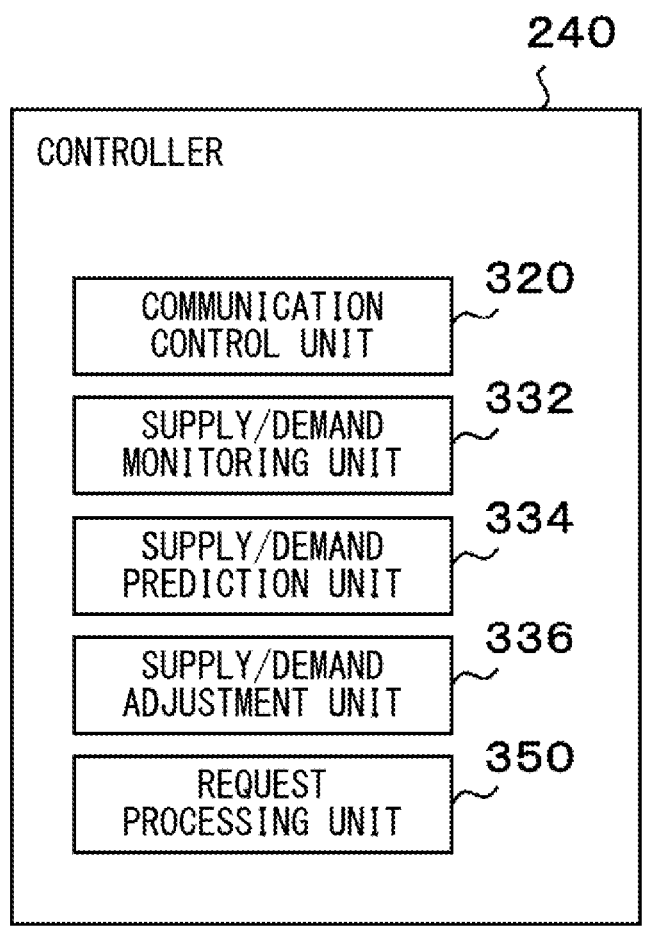
FIG. 3 schematically shows an example of an internal configuration of a controller 240.

FIG. 3 schematically shows an example of an internal configuration of the controller 240. In the present embodiment, the controller 240 includes a communication control unit 320, a supply/demand monitoring unit 332, a supply/demand prediction unit 334, a supply/demand adjustment unit 336, and a request processing unit 350.

For the supplier/demander facility 112, the supply/demand monitoring unit 332 of the supplier/demander facility 114 may be an example of a supply/demand situation acquisition unit. Likewise, for the supplier/demander facility 114, the supply/demand monitoring unit 332 of the supplier/demander facility 112 may be an example of a supply/demand situation acquisition unit.

In the present embodiment, the communication control unit 320 is configured to control communication between the controller 240 and other devices. The communication control unit 320 may be various types of communication interfaces. The communication control unit 320 may correspond to one or more communication methods. In one embodiment, the communication control unit 320 is configured to control communication between the controller 240 and other devices disposed in the supplier/demander facility 112. In another embodiment, the communication control unit 320 is configured to control communication between the controller 240 and the energy management apparatus 140.

In the present embodiment, the supply/demand monitoring unit 332 is configured to monitor power supply/demand of the supplier/demander facility 112. The supply/demand monitoring unit 332 is configured to acquire information about a situation of the power supply/demand of the supplier/demander facility 112. The supply/demand monitoring unit 332 may be configured to acquire information about a situation of a power supply/demand from at least one of the power load 210, the power supply apparatus 220 and the power distribution apparatus 230.

The supply/demand monitoring unit 332 may acquire the information about the situation of the power supply/demand when a predetermined event occurs. As the predetermined event, (i) an event that predetermined time has come, (ii) an event that a predetermined time period has elapsed after the previous acquisition of the information, and (iii) an event that an instruction to acquire the information is received from the supplier/demander terminal 250 may be exemplified.

The supply/demand monitoring unit 332 may be configured to acquire the information about the situation of the power supply/demand every unit time period. A length of the unit time period is not particularly limited. The unit time period may be 5 minutes, 10 minutes, 15 minutes, 30 minutes, one hour, 2 hours, 3 hours, 6 hours, 12 hours or one day.

As the information about the situation of the power supply/demand of the supplier/demander facility 112, information about power (which may also be referred to as demand power) consumed by the supplier/demander facility 112, information about power supplied by the supplier/demander facility 112, information about power accumulated by the power storage device 224 of the supplier/demander facility 112, information about surplus power of the supplier/demander facility 112, information about power transmitted to the outside by the supplier/demander facility 112, information about power received from the outside by the supplier/demander facility 112, and the like may be exemplified. As the information about power, information indicative of a statistical value of the instantaneous power [kW] during each unit time period, information indicative of the amount of power [kWh] during each unit time period, and the like may be exemplified.

As the statistical value, a maximum value, a minimum value, an average value, a medium value, a mode value, a degree of scatter and the like may be exemplified. For simple descriptions, [kW] is used as a unit of the instantaneous power. However, other units can also be used. Likewise, [kWh] is used as a unit of the amount of power, but other units can also be used.

The supply/demand monitoring unit 332 may be configured to transmit the information about the situation of the power supply/demand to the energy management apparatus 140. The supply/demand monitoring unit 332 may be configured to transmit the information about the situation of the power supply/demand to the energy management apparatus 140, in association with information indicative of demand or supply of power, or time or time period at which power transmission and reception has occurred. The supply/demand monitoring unit 332 may be configured to store the information about the situation of the power supply/demand in a storage unit (not shown) of the controller 240. In the meantime, as the term indicating time or time period, terms such as a point of time, a moment and the like may also be used.

In the present embodiment, the supply/demand prediction unit 334 is configured to predict at least one of power demand and power supply of the supplier/demander facility 112 at a future time or time period. The time or time period at which the prediction is made may also be referred to as prediction time. The supply/demand prediction unit 334 is configured to predict the power supply/demand of the supplier/demander facility 112 at prediction time, based on information (which may also be referred to as supply/demand performance) about the power supply/demand of the supplier/demander facility 112 during any past time period, for example. The supply/demand prediction unit 334 may be configured to predict at least one of the statistical value of the instantaneous power and the amount of power at prediction time.

The supply/demand prediction unit 334 may be configured to prepare a variety of plans relating to the power supply/demand by using a prediction result of the power supply/demand. For example, the supply/demand prediction unit 334 prepares at least one of a power generation plan of the power generation device 222 and a charging/discharging plan of the power storage device 224, based on a predicted value of the power demand. The supply/demand prediction unit 334 may be configured to prepare a plan relating to use restriction of the power load 210, based on a predicted value of the power supply. The supply/demand prediction unit 334 may be configured to prepare a plan relating to power transmission and reception of the supplier/demander facility 112 and the power transmission and distribution grid 122, based on the predicted value of the power demand, the predicted value of the power supply and the predicted value of a remaining amount of power accumulated in the power storage device 224, for example.

The supply/demand prediction unit 334 may be configured to transmit information indicative of a prediction result to the energy management apparatus 140. The supply/demand prediction unit 334 may be configured to associate information indicative of prediction time and a prediction result corresponding to the prediction time, and to transmit the same to the energy management apparatus 140. The supply/demand prediction unit 334 may be configured to store the information indicative of the prediction result in the storage unit (not shown) of the controller 240. The information indicative of the prediction result may include the information about the plan.

In the present embodiment, the supply/demand adjustment unit 336 is configured to adjust the power supply/demand of the supplier/demander facility 112. For example, the supply/demand adjustment unit 336 adjusts at least one of demand power and supply power of the supplier/demander facility 112 by controlling one or more devices disposed in the supplier/demander facility 112. The supply/demand adjustment unit 336 may be configured to adjust at least one of an amount of power transmission to the power transmission and distribution grid 122 and an amount of power reception from the power transmission and distribution grid 122 by controlling one or more devices disposed in the supplier/demander facility 112. The supply/demand adjustment unit 336 may be configured to generate a command for controlling at least one of one or more devices disposed in the supplier/demander facility 112. The supply/demand adjustment unit 336 may be configured to transmit the generated command to a device corresponding to the command.

The supply/demand adjustment unit 336 may be configured to adjust the supply and demand of the supplier/demander facility 112, based on a monitoring result of the supply/demand monitoring unit 332 and a prediction result of the supply/demand prediction unit 334. For example, the supply/demand adjustment unit 336 adjusts the supply and demand of the supplier/demander facility 112, based on the plan of the power supply/demand prepared by the supply/demand prediction unit 334 and the performance of the power supply/demand acquired by the supply/demand monitoring unit 332.

The supply/demand adjustment unit 336 may be configured to determine a degree of pressure for power supply/demand, based on the monitoring result of the supply/demand monitoring unit 332. The supply/demand adjustment unit 336 may be configured to estimate a degree of pressure for future power supply/demand, based on the prediction result of the supply/demand prediction unit 334.

The degree of pressure for power supply/demand may be a parameter indicative of a probability of power shortage. The degree of pressure for power supply/demand may be indicated by continuous numerical values or stepwise divisions. Each division may be distinguished by a symbol, a character or a number.

The degree of pressure for power supply/demand may be determined, based on at least one of the surplus power and the supply remaining power of power. For example, the degree of pressure for power supply/demand is determined, based on (i) a ratio of the surplus power or the supply remaining power to the demand power, (ii) a ratio of the surplus power or the supply remaining power to the supply capability of power, (iii) a power supply/demand state of the system power grid 12 provided from an administrator or operator of the system power grid 12, and the like. The degree of pressure for power supply/demand may be determined, based on power supply when power is not received from the outside. The supply/demand adjustment unit 336 maybe configured to acquire information, which indicates a power supply/demand state of the system power grid 12, from the wide-area management server 180.

In the present embodiment, the request processing unit 350 is configured to receive various types of requests from other devices and to process the requests. In one embodiment, the request processing unit 350 is configured to process requests from other devices disposed in the supplier/demander facility 112. For example, the request processing unit 350 processes a request from the supplier/demander terminal 250. The request processing unit 350 may be configured to generate requests to other devices and to transmit the requests to the other devices, in correspondence to the request from the supplier/demander terminal 250. In another embodiment, the request processing unit 350 is configured to process requests from other devices outside the supplier/demander facility 112. For example, the request processing unit 350 is configured to process a request from the supplier/demander facility 114 or the energy management apparatus 140.

[Outline of Energy Management Apparatus 140]

Figure 4:
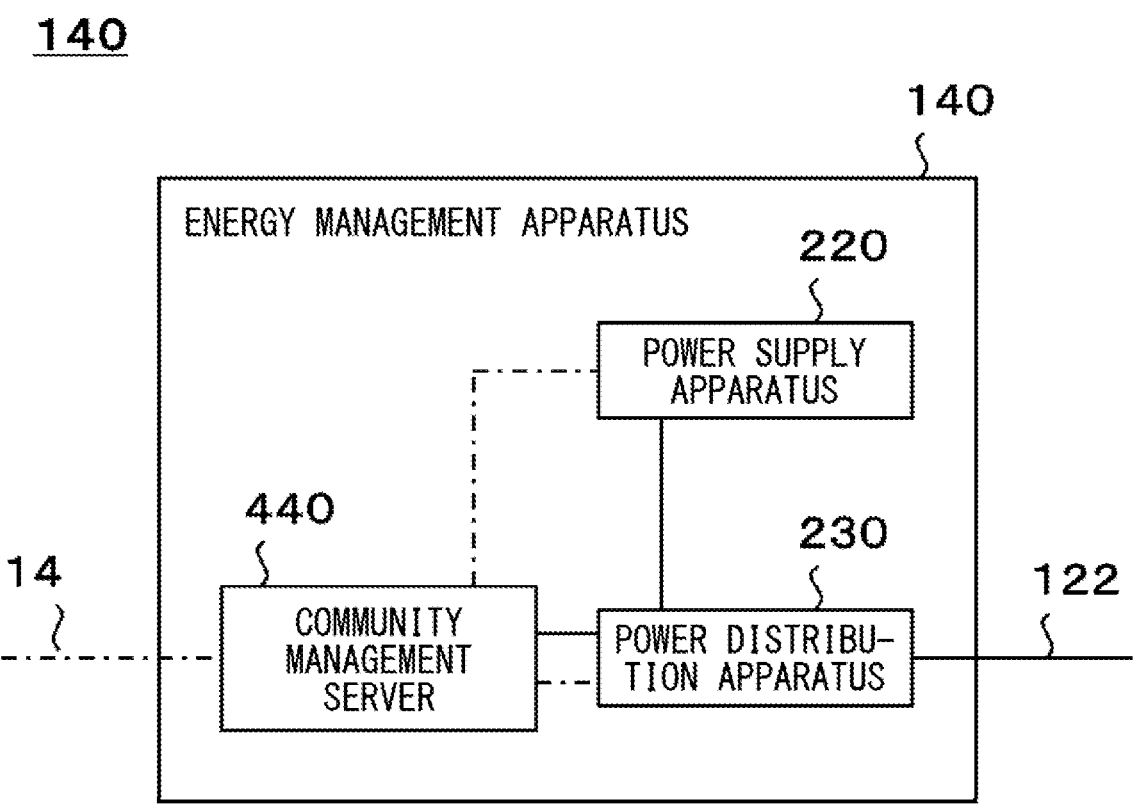
FIG. 4 schematically shows an example of an internal configuration of an energy management apparatus 140.

FIG. 4 schematically shows an example of an internal configuration of the energy management apparatus 140. In the present embodiment, the energy management apparatus 140 includes a power supply apparatus 220, a power distribution apparatus 230, and a community management server 440. The community management server 440 may be an example of a power information management system, a power information management server and a power system.

In the present embodiment, the power supply apparatus 220 is different from the power supply apparatus 220 of the supplier/demander facility 112, in that it operates under control of the community management server 440. As to features except the difference, the power supply apparatus 220 of the energy management apparatus 140 may have a similar configuration to the power supply apparatus 220 of the supplier/demander facility 112.

In the present embodiment, the power distribution apparatus 230 is different from the power distribution apparatus 230 of the supplier/demander facility 112, in that it is configured to control power distribution between the power transmission and distribution grid 122 and each of the power supply apparatus 220 and the community management server 440. As to features except the difference, the power distribution apparatus 230 of the energy management apparatus 140 may have a similar configuration to the power distribution apparatus 230 of the supplier/demander facility 112.

[Outline of Community Management Server 440] In the present embodiment, the community management server 440 is configured to manage energy that is used in the community 102. For example, the community management server 440 is configured to manage power that is used in the community 102. The community management server 440 is configured to manage the power supply/demand of the community 102. The community management server 440 may be configured to manage power interchange in the community 102. The community management server 440 may be configured to manage power interchange between the community 102 and another community.

The community management server 440 is configured to execute processing for maintaining stability and quality of electricity to flow through the power transmission and distribution grid 122. The community management server 440 is configured to execute processing for maintaining stability and quality of electricity to flow through the system power grid 12. The community management server 440 may be configured to execute processing for maintaining stability and quality of electricity to flow through the system power grid 12, in cooperation with the wide-area management server 180. The community management server 440 will be described in detail later.

[Specific Configurations of Respective Units of Community Management Server 440]

The community management server 440 may be implemented by hardware, software or hardware and software. In a case in which at least some of the constitutional elements configuring the community management server 440 are implemented by software, the constitutional element to be implemented by the software may be implemented by activating a program, in which operations relating to the constitutional element are prescribed, in an information processing device having a general configuration.

The information processing device includes, for example, (i) a data processing device including a processor such as a CPU, a GPU and the like, a ROM, a RAM, a communication interface, and the like, (ii) an input device such as a keyboard, a touch panel, a camera, a microphone, various types of sensors, a GPS receiver, and the like, (iii) an output device such as a display device, a speaker, a vibration device and the like, and (iv) a storage device (including an external storage device) such as a memory, an HDD and the like. In the information processing device, the data processing device or storage device may be configured to store a program. The program may be stored in a non-transitory, computer-readable recording medium. The program is executed by the processor, thereby causing the information processing device to execute the operations prescribed by the program. The program may be a program for causing a computer to function as the community management server 440.

In one embodiment, the program may be a program for causing a computer configured to implement the community management server 440 to execute a power information management method. The management method includes supply information acquiring of acquiring an amount of supplied power correlation correlating with an amount of externally-supplied power, which is an amount of power supplied to an outside by a power supplier/demander having at least one of a power generation apparatus and a power storage apparatus, for example. The management method includes receipt information acquiring of acquiring an amount of received power correlation correlating with an amount of externally-received power, which is an amount of power received from the outside by the power supplier/ demander, for example. The management method includes available amount determining of determining an amount of available power correlation that can be used by the power supplier/demander, the amount of available power correlation correlating with an amount of power that can be used, profited or disposed by the power supplier/demander, for example. In the management method, the available amount determining may include determining the amount of available power correlation at a specific point of time, based on (A) the amount of supplied power correlation, (B) the amount of received power correlation, and (C) information about an elapsed time period from (i) a point of time at which the power supplier/demander supplies power to the outside, or (ii) a point of time at which a difference between the amount of supplied power correlation and the amount of received power correlation meets a preset first condition to the specific point of time.

In another embodiment, the program may be a program for causing a computer configured to implement the community management server 440 to execute a power information management method. The management method includes supply information acquiring of acquiring an amount of supplied power correlation correlating with an amount of externally-supplied power, which is an amount of power supplied to an outside by a power supplier/demander having at least one of a power generation apparatus and a power storage apparatus, for example. The management method includes receipt information acquiring of acquiring an amount of received power correlation correlating with an amount of externally-received power, which is an amount of power received from the outside by the power supplier/demander, for example. The management method includes supply/demand situation acquiring of acquiring information about a situation of the power supply/demand, for example. The management method includes available amount determining of determining an amount of available power correlation that can be used by the power supplier/demander, the amount of available power correlation correlating with an amount of power that can be used, profited or disposed by the power supplier/demander, for example. In the management method, the available amount determining may include determining the amount of available power correlation at a specific point of time, based on (A) the amount of supplied power correlation, (B) the amount of received power correlation, and (F) the information about the situation of the power supply/demand at the specific point of time, which is acquired in the supply/demand situation acquiring.

In another embodiment, the program may be a program for causing a computer configured to implement the community management server 440 to execute a power information management method. The management method includes supply information acquiring of acquiring an amount of supplied power correlation correlating with an amount of externally-supplied power, which is an amount of power supplied to an outside by a power supplier/demander having at least one of a power generation apparatus and a power storage apparatus, for example. The management method includes receipt information acquiring of acquiring an amount of received power correlation correlating with an amount of externally-received power, which is an amount of power received from the outside by the power supplier/demander, for example. The management method includes supply/demand situation acquiring of acquiring information about a situation of the power supply/demand, for example. The management method includes available amount determining of determining an amount of available power correlation that can be used by the power supplier/demander, the amount of available power correlation correlating with an amount of power that can be used, profited or disposed by the power supplier/demander, for example. In the management method, the available amount determining may include determining the amount of available power correlation, based on (A) the amount of supplied power correlation, (B) the amount of received power correlation, and (G) the information about the situation of the power supply/demand at a point of time at which the power supplier/demander supplies power to the outside, the information being acquired in the supply/demand situation acquiring.

Figure 5:
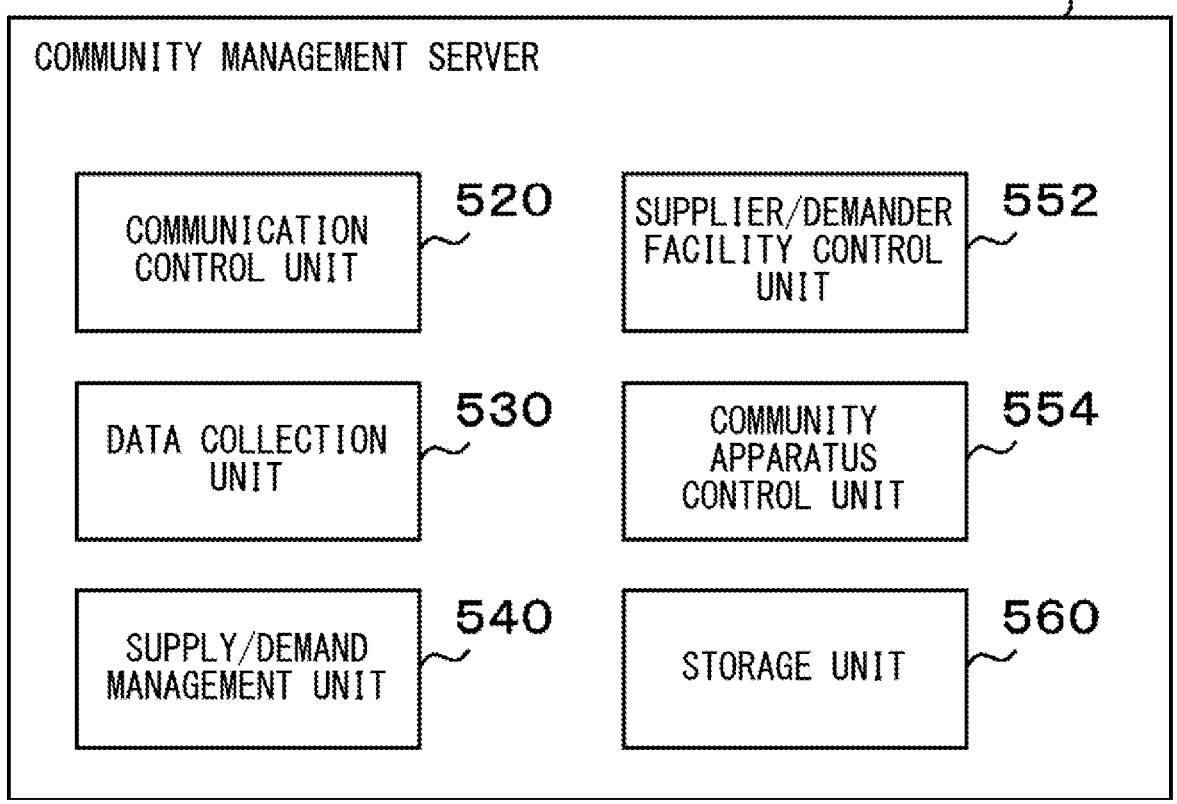
FIG. 5 schematically shows an example of an internal configuration of a community management server 440.

FIG. 5 schematically shows an example of an internal configuration of the community management server 440. In the present embodiment, the community management server 440 includes a communication control unit 520, a data collection unit 530, a supply/demand management unit 540, a supplier/demander facility control unit 552, a community apparatus control unit 554, and a storage unit 560.

The data collection unit 530 may be an example of a supply/demand situation acquisition unit. The supply/demand management unit 540 may be an example of a power information management system.

In the present embodiment, the communication control unit 520 is configured to control communication between the community management server 440 and other devices. The communication control unit 520 may be a variety of communication interfaces. The communication control unit 520 may corresponds to one or more communication methods.

The communication control unit 520 may be configured to control communication between the community management server 440 and devices disposed in the energy management apparatus 140. The communication control unit 520 may be configured to control communication between the community management server 440 and the controller 240 disposed in each of the plurality of supplier/demander facilities configuring the community 102. The communication control unit 520 may be configured to control communication between the community management server 440 and at least one of the electric substation apparatus 120 and the interchange apparatus 160.

The communication control unit 520 may be configured to control communication between the community management server 440 of the community 102 and the community management server 440 of another community. The communication control unit 520 may be configured to control communication between the community management server 440 and the wide-area management server 180.

In the present embodiment, the data collection unit 530 is configured to collect a variety of information about the community 102. The data collection unit 530 is configured to acquire, from the controllers 240 disposed in each of the plurality of supplier/demander facilities configuring the community 102, information about power supplies/demands of the supplier/demander facilities, for example. The data collection unit 530 may be configured to acquire information about performance of power transmission and reception between the system power grid 12 and the community 102 from the electric substation apparatus 120. The data collection unit 530 may be configured to acquire information about performance of power transmission and reception between the community 102 and the community 104 from the interchange apparatus 160.

Each of the plurality of supplier/demander facilities configuring the community 102, the electric substation apparatus 120 and the interchange apparatus 160 may be configured to transmit the information to the data collection unit 530, in response to a request from the data collection unit 530 or periodically. The data collection unit 530 may be configured to store the collected information in the storage unit 560.

In the present embodiment, the supply/demand management unit 540 is configured to manage the power supply/demand of the community 102. For example, the supply/demand management unit 540 acquires the information about the situation of the power supply/demand in each supplier/demander facility, from each of the supplier/demander facility 112 and the supplier/demander facility 114. In the present embodiment, the supply/demand management unit 540 is configured to convert and manage an amount of power supplied to an outside by each supplier/demander facility (which may also be referred to as an amount of power transmission) and an amount of power received from the outside by each supplier/demander facility (which may also be referred to as an amount of power reception) into electronic values. The electronic value may also be referred to as a point, a mileage and the like. The electronic value may also be an electronic money. The supply/demand management unit 540 will be described in detail later.

In the present embodiment, the supplier/demander facility control unit 552 is configured to generate a command for controlling each of the plurality of supplier/demander facilities to be managed by the community management server 440. The supplier/demander facility control unit 552 is configured to transmit the generated command to the supplier/demander facility, which is a target of the command. Thereby, the community management server 440 can control each supplier/demander facility.

In the present embodiment, the community apparatus control unit 554 is configured to generate a command for controlling at least one of the power supply apparatus 220 and the power distribution apparatus 230 disposed in the energy management apparatus 140. The supplier/demander facility control unit 552 is configured to transmit the generated command to the facility, which is a target of the command. Thereby, the community management server 440 can control power transmission and reception of the energy management apparatus 140.

In the present embodiment, the storage unit 560 is configured to store a variety of information, which is necessary for information processing in each unit of the community management server 440. The storage unit 560 may be configured to store a variety of information generated by each unit of the community management server 440. For example, the storage unit 560 stores the information collected by the data collection unit 530. The storage unit 560 may be configured to store information about information processing to be executed in the supply/demand management unit 540. As the information processing to be executed in the supply/demand management unit 540, processing for managing an amount of electronic values held by each supplier/demander facility, processing for managing billing for each supplier/demander facility, and the like may be exemplified.

[Outline of Respective Units of Supply/Demand Management Unit 540]

Figure 6:
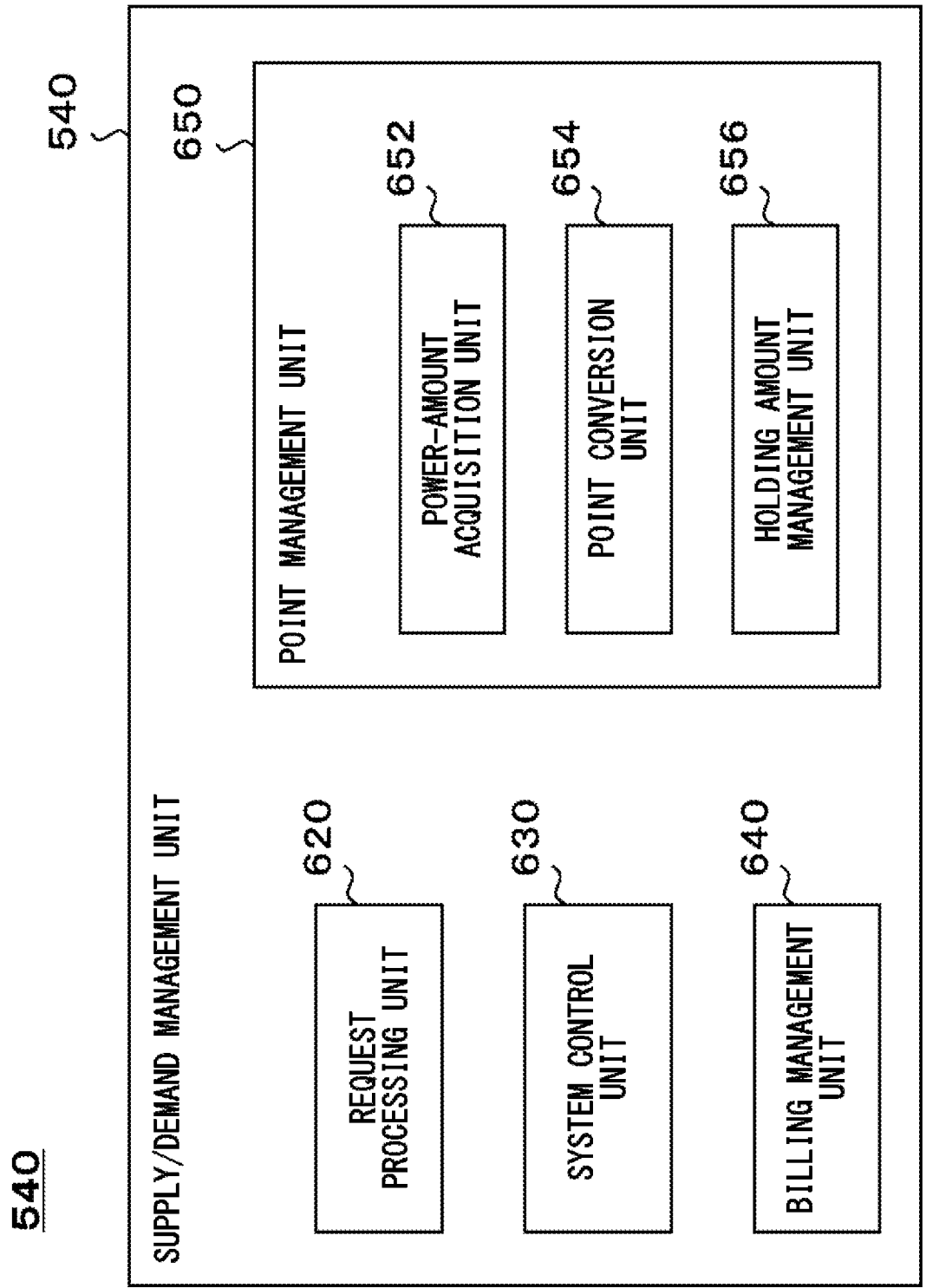
FIG. 6 schematically shows an example of an internal configuration of a supply/demand management unit 540.

FIG. 6 schematically shows an example of an internal configuration of the supply/demand management unit 540. In the present embodiment, the supply/demand management unit 540 includes a request processing unit 620, a system control unit 630, a billing management unit 640, and a point management unit 650. In the present embodiment, the point management unit 650 includes a power-amount acquisition unit 652, a point conversion unit 654, and a holding amount management unit 656.

The request processing unit 620 may be an example of a request acquisition unit. The system control unit 630 may be an example of a receipt permission unit and a power transmission/reception control unit. The point management unit 650 may be an example of a power information management system. The power-amount acquisition unit 652 may be an example of a supply/demand situation acquisition unit. The point conversion unit 654 may be an example of a supply information acquisition unit and a receipt information acquisition unit. The holding amount management unit 656 may be an example of a power information management system.

In the present embodiment, the request processing unit 620 is configured to receive various types of requests. The request processing unit 620 is configured to process the received requests, and to respond to the requests. The request processing unit 620 may be configured to execute at least a part of a plurality of processing associated with the received requests, in cooperation with the other elements of the community management server 440. The request processing unit 620 may be configured to transfer at least a part of the received requests to the other elements of the supply/demand management unit 540.

In the present embodiment, the request processing unit 620 is configured to receive a request from at least one of the plurality of supplier/demander facilities configuring the community 102. As the request from the supplier/demander facility configuring the community 102, (i) a request indicating that the supplier/demander facility wants to supply power to the power transmission and distribution grid 122, (ii) a request indicating that the supplier/demander facility wants to receive power from the power transmission and distribution grid 122, and the like may be exemplified.

The request processing unit 620 may be configured to receive a request from the wide-area management server 180. As the request from the wide-area management server 180, a request for increasing or decreasing an amount of power transmission from the community 102 to the system power grid 12, a request for increasing or decreasing an amount of power reception from the community 102 to the system power grid 12, and the like may be exemplified.

In the present embodiment, the system control unit 630 is configured to manage the power supply/demand of the community 102. The system control unit 630 may be configured to manage the power supply/demand of the community 102 in accordance with a sequence similar to the sequence by which the supply/demand adjustment unit 336 manages the power supply/demand of the supplier/demander facility. The system control unit 630 may be configured to determine a degree of pressure for power supply/demand of the community 102 by monitoring the power supply/demand of the community 102.

The system control unit 630 may be configured to adjust the power supply/demand of the community 102 by controlling operations of the electric substation apparatus 120. For example, the system control unit 630 transmits, as a command to the electric substation apparatus 120, a command for switching an electrical connection relation between the system power grid 12 and the power transmission and distribution grid 122 to the electric substation apparatus 120. The system control unit 630 may be configured to transmit information about power, which is to be transmitted and received between the system power grid 12 and the power transmission and distribution grid 122, to the electric substation apparatus 120.

The system control unit 630 may be configured to adjust the power supply/demand of the community 102 by controlling operations of the interchange apparatus 160. For example, the system control unit 630 transmits, as a command to the interchange apparatus 160, a command for switching an electrical connection relation between the self-owned line 16 and the power transmission and distribution grid 122 to the interchange apparatus 160. The system control unit 630 may be configured to transmit information about power, which is to be transmitted and received between the self-owned line 16 and the power transmission and distribution grid 122, to the interchange apparatus 160.

The system control unit 630 may be configured to adjust the power supply/demand of the community 102 by controlling one or more power supply apparatuses 220 disposed in at least one of the plurality of supplier/demander facilities configuring the community 102. The system control unit 630 may be configured to control the power supply apparatus 220 via the controller 240 of each supplier/demander facility. For example, the system control unit 630 transmits a command for causing the power supply apparatus 220 to adjust an amount of power generation and an amount of charging and discharging, to the controller 240.

The system control unit 630 may be configured to adjust the power supply/demand of the community 102 by controlling one or more power distribution apparatuses 230 disposed in at least one of the plurality of supplier/demander facilities configuring the community 102. The system control unit 630 may be configured to control the power distribution apparatus 230 via the controller 240 of each supplier/demander facility. For example, the system control unit 630 transmits a command for causing the power distribution apparatus 230 to switch an electrical connection relation between the power transmission and distribution grid 122 and the internal wiring of the supplier/demander facility 112, to the controller 240. Thereby, the system control unit 630 can restrict or control power transmission and reception between each supplier/demander facility and the power transmission and distribution grid 122.

The system control unit 630 may be configured to adjust the power supply/demand of the community 102 by controlling the power supply apparatus 220 and the power distribution apparatus 230 of the energy management apparatus 140. For example, when power supplied from the plurality of supplier/demander facilities configuring the community 102 to the power transmission and distribution grid 122 is insufficient, the system control unit 630 supplies power from the power supply apparatus 220 of the energy management apparatus 140 to the power transmission and distribution grid 122. When power supplied from the plurality of supplier/demander facilities configuring the community 102 to the power transmission and distribution grid 122 is excessive, the system control unit 630 receives power from the power transmission and distribution grid 122, and accumulates the power in the power storage device 224 of the energy management apparatus 140.

The system control unit 630 may be configured to control a power supply system to which one or more power supply apparatuses 220 are electrically connected via the power transmission and distribution grid 122 by controlling at least one of the power supply apparatus 220 and the power distribution apparatus 230 disposed in the energy management apparatus 140 or each supplier/demander facility. The power supply system may have a configuration in which two or more power supply apparatuses 220 disposed in two or more supplier/demander facilities are electrically connected. The power supply system may have a configuration in which at least two of the plurality of power generation devices 222 and the plurality of power storage devices 224 disposed in each of the plurality of supplier/demander facilities are electrically connected. The power supply system may have a configuration in which at least one of the power generation device 222 and the power storage device 224 disposed in one supplier/demander facility and at least one of the power generation device 222 and the power storage device 224 disposed in the other supplier/demander facility are electrically connected. Thereby, a virtual power storage system in which the surplus power or the supply remaining power of the community 102 is used is established.

A user of each supplier/demander facility configuring the community 102 can accumulate power in the virtual power storage system by transmitting the surplus power of each facility to the power transmission and distribution grid 122. At this time, the power supplied from one supplier/demander facility to the power transmission and distribution grid 122 may be used as the surplus power of the community 102 by the other supplier/demander facility or the energy management apparatus 140, for example.

In the meantime, the user of each supplier/demander facility configuring the community 102 can use the power accumulated in the virtual power storage system by receiving the surplus power of the community 102 from the power transmission and distribution grid 122. At this time, the power received from the power transmission and distribution grid 122 by one supplier/demander facility may be the surplus power of the community 102, the power accumulated in the power storage device 224 of the other supplier/demander facility or the energy management apparatus 140, or the power generated using power generation remaining power of the power generation device 222 of the other supplier/demander facility or the energy management apparatus 140.

The system control unit 630 is configured to control power transmission and reception between the power supply system and each of one or more supplier/demander facilities. For example, the system control unit 630 determines whether or not to permit each user to receive power from the power transmission and distribution grid 122. The system control unit 630 may be configured to permit power transmission from the power supply system to each user, within a range of an amount of power corresponding to a holding point of each user, which is managed by the point management unit 650. The holding point will be described in detail later.

When the user wants to receive power equal to or greater than the user's holding point, the system control unit 630 may charge for an amount of power to be supplied to the user beyond an amount of power corresponding to the holding point. When the user wants to receive power equal to or greater than the user's holding point, the system control unit 630 may prevent power from being supplied to the user beyond the amount of power corresponding to the holding point by controlling the power distribution apparatus 230 of the supplier/demander facility that the user uses.

When the user wants to receive power equal to or greater than the user's holding point, the system control unit 630 may restrict a supply aspect of power to be supplied to the user beyond the amount of power corresponding to the holding point by controlling the power distribution apparatus 230 of the supplier/demander facility that the user uses. As the restriction of the supply aspect, (i) a restriction of reducing an amount of current, as compared to a case in which power is supplied within a range of the amount of power corresponding to the holding point, (ii) a restriction of setting an upper limit of an amount of power to be supplied beyond the amount of power corresponding to the holding point, and the like may be exemplified.

In the present embodiment, the billing management unit 640 is configured to settle power transmission and reception between the supplier/demander facility and the community 102, for each of the plurality of supplier/demander facilities configuring the community 102. The billing management unit 640 may be configured to settle power interchange between the supplier/demander facility and another supplier/demander facility, for each of the plurality of supplier/demander facilities configuring the community 102.

For example, the billing management unit 640 totalizes the amount of power transmission and the amount of power reception between the supplier/demander facility and the community 102 or another supplier/demander facility every predetermined time period (which may also be referred to as settlement time period), for each of the plurality of supplier/demander facilities configuring the community 102. The billing management unit 640 may be configured to totalize revenue and expenditure on power every settlement time period, for each of the plurality of supplier/demander facilities configuring the community 102.

In the present embodiment, the billing management unit 640 may be configured to totalize the amount of power transmission and the amount of power reception between the supplier/demander facility and the community 102 or another supplier/demander facility every unit time period, which is included in the settlement time period, for each of the plurality of supplier/demander facilities configuring the community 102. The billing management unit 640 may be configured to separate and manage the amount of power transmission every unit time period into an amount of power selling to the system power grid 12 or the energy management apparatus 140 and an amount of power storage in the virtual power storage system, for each of the plurality of supplier/demander facilities. Likewise, the billing management unit 640 may be configured to separate and manage the amount of power reception every unit time period into an amount of power purchase from the system power grid 12 or the energy management apparatus 140 and a using amount of power accumulated in the virtual power storage system, for each of the plurality of supplier/demander facilities.

In the present embodiment, the billing management unit 640 has been described in detail with reference to the example in which the billing management unit 640 totalizes revenue and expenditure on power, for each of the plurality of supplier/demander facilities configuring the community 102. However, the billing management unit 640 is not limited to the present embodiment. In another embodiment, the billing management unit 640 may be configured to totalize revenue and expenditure on power for each of a plurality of users by a similar sequence to the above-described sequence.

In the present embodiment, the point management unit 650 is configured to convert and manage an amount of power supplied to an outside by each supplier/demander facility (which may also be referred to as an amount of power transmission) and an amount of power received from the outside by each supplier/demander facility (which may also be referred to as an amount of power reception) into electronic values. In the present embodiment, for simple descriptions, the point management unit 650 is described in detail with reference to an example in which the amount of power transmission and the amount of power reception are converted and managed into points.

The amount of power transmission may be an example of an amount of externally-supplied power. The amount of power reception may be an example of an amount of externally-received power. An amount of the electronic value may be an example of an amount (which may also be referred to as 'amount of power correlation') correlating with the amount of power.

The amount of externally-supplied power of each supplier/demander facility may be an amount of power to be supplied to the outside by each supplier/demander facility. The amount of externally-supplied power of each supplier/demander facility may be an amount of power, which corresponds to an amount of power to be received by a power storage apparatus disposed outside each supplier/demander facility, of the amount of power to be supplied to the outside by each supplier/demander facility. The power storage apparatus may be at least one of the plurality of power storage devices 224 (which may also be referred to as the plurality of power storage devices disposed in the community 102) disposed in each of the plurality of supplier/demander facilities configuring the community 102 and the energy management apparatus 140 of the community 102.

In one embodiment, an amount of externally-supplied power of a specific supplier/demander facility during a specific time period P may be the same as an amount of power supplied to the outside by the supplier/demander facility during the time period P. The amount of externally-supplied power may be a value in which loss associated with power transmission and distribution, charging/discharging and the like are considered.

In another embodiment, the amount of externally-supplied power Pa[kWh] of the specific supplier/demander facility during the specific time period P may be determined, based on (i) an amount of power Pb[kWh] supplied from the specific supplier/demander facility to the community 102 during the time period P, (ii) an amount of power Pc[kWh] supplied from each supplier/demander facility of the community 102, the energy management apparatus 140 of the community 102 and the outside of the community 102 to the community 102 during the time period P, and (iii) an amount of power Pd[kWh] accumulated in the plurality of power storage devices 224 disposed in the community 102 during the time period P. For example, the amount of externally-supplied power Pa may be calculated as Pa=Pdx (Pb/Pc). In the meantime, the calculation method of the amount of externally-supplied power Pa is not limited to the present embodiment. For calculation of the amount of externally-supplied power Pa, loss associated with power transmission and distribution, charging/discharging and the like may be further considered.

The amount of externally-received power of each supplier/demander facility may be an amount of power to be received from the outside by each supplier/demander facility. The amount of externally-received power of each supplier/demander facility may be an amount of power, which corresponds to an amount of power to be supplied from the power storage apparatus disposed outside each supplier/demander facility, of the amount of power to be received from the outside by each supplier/demander facility.

In one embodiment, an amount of externally-received power of a specific supplier/demander facility during a specific time period P may be the same as an amount of power received from the outside by the supplier/demander facility during the time period P. The amount of externally-received power may be a value in which loss associated with power transmission and distribution, charging/discharging and the like are considered.

In another embodiment, the amount of externally-supplied power Pe[kWh] of the specific supplier/demander facility for the specific time period P may be determined, based on (i) an amount of power Pf[kWh] received from the community 102 by the specific supplier/demander facility during the time period P, (ii) a total amount of power supply Pg[kWh] of the community 102 during the time period P, and (iii) an amount of power Ph[kWh] supplied from the plurality of power storage devices 224 disposed in the community 102 to the community 102 during the time period P. For example, the externally-received power Pe may be calculated as Pe=Pf×(Ph/Pg). In the meantime, the calculation method of the amount of externally-received power Pe is not limited to the present embodiment. For calculation of the amount of externally-received power Pe, loss associated with power transmission and distribution, charging/discharging and the like may be further considered.

In the present embodiment, the power-amount acquisition unit 652 is configured to acquire information about the power supply/demand of each supplier/demander facility from one or more supplier/demander facilities configuring the community 102. The power-amount acquisition unit 652 may be configured to output the acquired information to the point conversion unit 654.

For example, the power-amount acquisition unit 652 acquires, from each of one or more supplier/demander facilities, at least one of (i) information indicative of the amount of power supplied to the power transmission and distribution grid 122 by each supplier/demander facility, and (ii) information indicative of the amount of power received from the power transmission and distribution grid 122 by each supplier/demander facility. The power-amount acquisition unit 652 may be configured to acquire, from each of one or more supplier/demander facilities, at least one of (i) information indicative of an amount of power supplied to the power transmission and distribution grid 122 by each supplier/demander facility and time of the supply, and (ii) information indicative of an amount of power received from the power transmission and distribution grid 122 by each supplier/demander facility and time of the reception.

In the present embodiment, the point conversion unit 654 is configured to convert the amount of power into a point. The point management unit 650 may be configured to convert the point into the amount of power. The point conversion unit 654 may be configured (i) to inter-convert the amount of power and the point for each of one or more supplier/demander facilities or (ii) to inter-convert the amount of power and the point for at least one of one or more supplier/demander facilities.

In the present embodiment, the point conversion unit 654 is configured to acquire information indicative of an amount of power supplied to an outside by each power supplier/demander, from the power-amount acquisition unit 652. The point conversion unit 654 is configured to convert the amount of power supplied to the outside by each power supplier/demander into a point. Thereby, the point conversion unit 654 is configured to acquire an amount of power correlation correlating with the amount of power supplied to the outside by each power supplier/demander. The point conversion unit 654 may be configured to output information, which indicates the number of points correlating with the amount of power supplied to the outside by the power supplier/demander, to the holding amount management unit 656.

In the present embodiment, the point conversion unit 654 is configured to acquire information indicative of an amount of power received from an outside by each power supplier/demander, from the power-amount acquisition unit 652. The point conversion unit 654 is configured to convert the amount of power received from the outside by each power supplier/demander into a point. Thereby, the point conversion unit 654 is configured to acquire an amount of power correlation correlating with the amount of power received from the outside by each power supplier/demander. The point conversion unit 654 may be configured to output information, which indicates the number of points correlating with the amount of power received from the outside by the power supplier/demander, to the holding amount management unit 656.

A conversion rate between the point and the power may be constant or vary with time. At the same time, a conversion rate corresponding to when the supplier/demander facility supplies power to the power transmission and distribution grid 122 and a conversion rate corresponding to when the supplier/demander facility receives power from the power transmission and distribution grid 122 may be the same or different from each other. The conversion rate may be a value [pt/kWh] obtained by dividing the number of points by the amount of power.

For example, the conversion rate is set higher during a time period in which the power supply/demand of the community 102 is pressed, as compared to the other time periods. Thereby, the power transmission from each supplier/demander facility to the power transmission and distribution grid 122 is promoted, and the power demand is suppressed in each supplier/demander facility. Whether or not the power supply/demand is pressed may be determined, based on the degree of pressure for power supply/demand of the community 102 determined by the system control unit 630.

In the present embodiment, for simple descriptions, the point management unit 650 is described in detail with reference to an example in which all power supplied to the power transmission and distribution grid 122 by each supplier/demander facility is converted into points and all power received from the power transmission and distribution grid 122 by each supplier/demander facility is converted into points. However, the point management unit 650 is not limited to the present embodiment.

In another embodiment, a part of the power supplied to the power transmission and distribution grid 122 by each supplier/demander facility may be converted into a point. Likewise, a part of the power received from the power transmission and distribution grid 122 by each supplier/demander facility may be converted into a point. Whether or not the power is converted into a point may be determined depending on whether the virtual power storage system is used or not. When the virtual power storage system is used, power is converted into a point. Whether or not the virtual power storage system is used may be determined based on a user's instruction of the supplier/demander facility or a variety of settings.

In the present embodiment, the holding amount management unit 656 is configured to points held by each supplier/demander facility, for each of one or more supplier/demander facilities configuring the community 102. The holding amount management unit 656 will be described in detail later.

Figure 7:
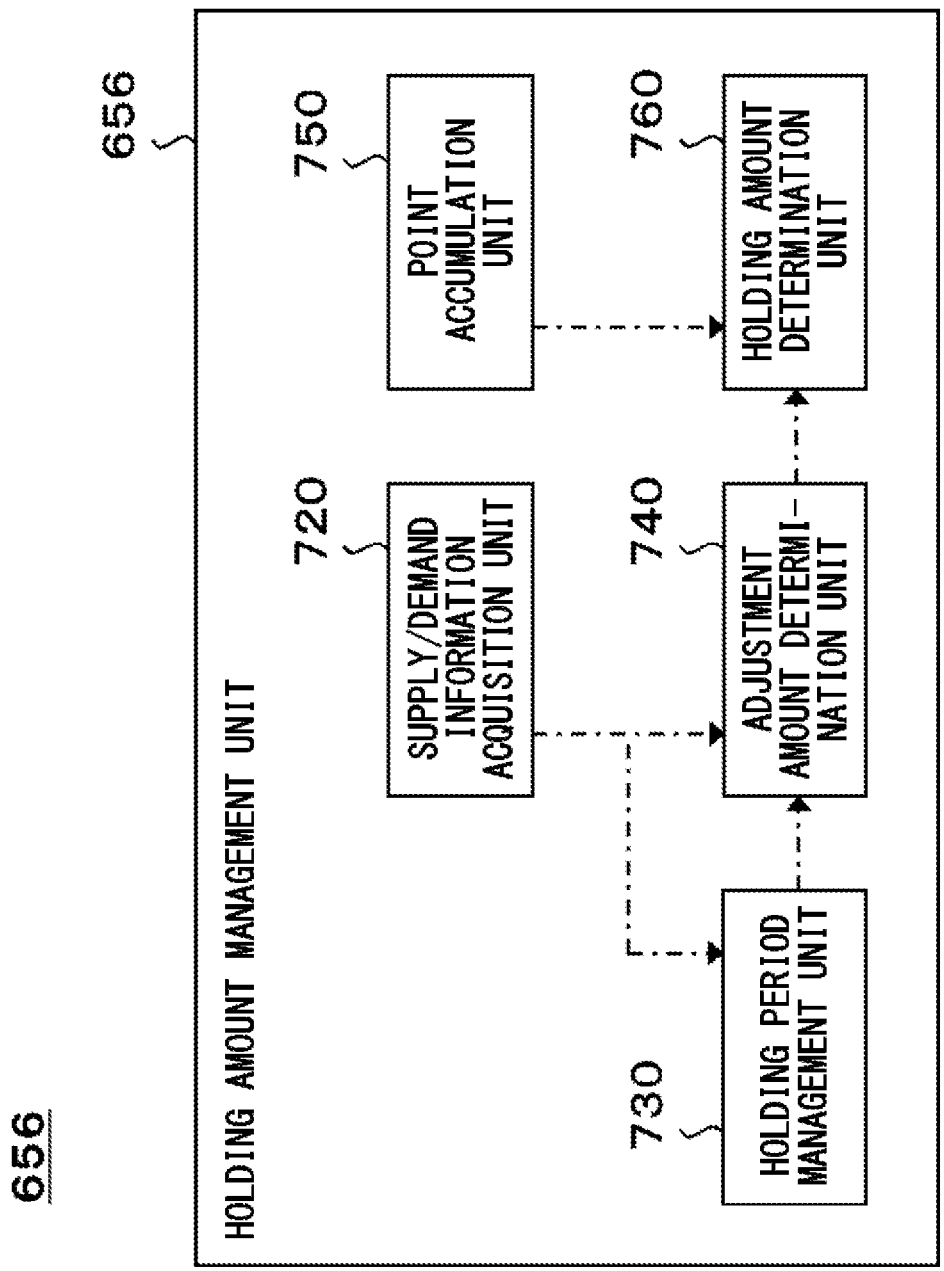
FIG. 7 schematically shows an example of an internal configuration of a holding amount management unit 656.

FIG. 7 schematically shows an example of an internal configuration of the holding amount management unit 656. In the present embodiment, the holding amount management unit 656 includes a supply/demand information acquisition unit 720, a holding period management unit 730, an adjustment amount determination unit 740, a point accumulation unit 750, and a holding amount determination unit 760. The respective units of the holding amount management unit 656 may be configured to transmit and receive information each other without being limited to the arrows in FIG. 7.

The supply/demand information acquisition unit 720 may be an example of a supply/demand situation acquisition unit. The adjustment amount determination unit 740 may be an example of a correction amount determination unit. The holding amount determination unit 760 may be an example of an available amount determination unit and a correction unit.

In the present embodiment, the supply/demand information acquisition unit 720 is configured to acquire the information about the situation of the power supply/demand of the community 102. The supply/demand information acquisition unit 720 may also be configured to acquire information about supply/demand balance of electricity to flow through the power transmission and distribution grid 122. For example, the supply/demand information acquisition unit 720 acquires information indicative of a degree of pressure for power supply/demand of the community 102 from the system control unit 630. The degree of pressure for power supply/demand of the community 102 may be an index determined based on an actual value of the power supply/demand of the community 102 or an index determined based on a predicted value of the power supply/demand of the community 102.

For example, the supply/demand information acquisition unit 720 outputs information, which indicates the supply remaining power of the community 102, to at least one of the holding period management unit 730 and the adjustment amount determination unit 740. The supply/demand information acquisition unit 720 may be configured to output the information about the supply remaining power at any time. In one embodiment, the supply/demand information acquisition unit 720 is configured to output information, which indicates a supply remaining power at a time when a specific supplier/demander facility supplies power to the power transmission and distribution grid 122. In another embodiment, the supply/demand information acquisition unit 720 is configured to output information, which indicates a supply remaining power at a time when a specific supplier/demander facility receives power from the power transmission and distribution grid 122. Also, in another embodiment, the supply/demand information acquisition unit 720 is configured to output information, which indicates a supply remaining power during a time period designated from the holding period management unit 730 or the adjustment amount determination unit 740.

In the present embodiment, for simple descriptions, the holding amount management unit 656 is described in detail with reference to an example in which the supply remaining power of the community 102 is used as an index indicative of the degree of pressure for power supply/demand of the community 102. However, it should be noted that the holding amount management unit 656 is not limited to the present embodiment.

In the present embodiment, the holding period management unit 730 is configured to manage information about a point holding period. As the information about a point holding period, information indicative of a point holding period, information about the power supply/demand during a point holding period, and the like may be exemplified.

In one embodiment, the holding period management unit 730 is configured to manage a point holding period. The point holding period may be an example of an elapsed time period. The point holding period may be (i) a time period from a point of time at which a specific supplier/demander facility supplies power to the power transmission and distribution grid 122 to a specific point of time or (ii) a time period from a point of time at which a difference between a point given to a specific supplier/demander facility and a point consumed by the supplier/demander facility meets a preset first condition to a specific point of time. The difference between a point given to the specific supplier/demander facility and a point consumed by the supplier/demander facility may be a difference (which may also be referred to as 'accumulated point difference') between an accumulated amount of points given to the supplier/demander facility and an accumulated amount of points consumed by the supplier/demander facility. The accumulated point difference may be a difference between an accumulated amount of points given to a specific user or member and an accumulated amount of points consumed by the user or member. The accumulated point difference may be an example of an amount obtained by subtracting points consumed by the user or member from points given to the specific user or member.

The specific point of time is not particularly limited. The specific point of time may be a point of time at which a specific supplier/demander facility consumes a point, a point of time designated from the specific supplier/demander facility or a point of time designated from the holding period management unit 730 or the adjustment amount determination unit 740.

As the preset first condition, (i) a condition that the accumulated point difference becomes zero (0), (ii) a condition that the accumulated point difference is within or outside a predetermined range, (iii) a condition that a parameter to be determined based on the accumulated point difference becomes zero (0), (iv) a condition that the parameter is within or outside a predetermined range, and the like may be exemplified. The predetermined range may be a numerical range or a range of divisions relating to stepwise evaluations. In a case in which the predetermined range is a numerical range, only an upper limit of the numerical range may be prescribed, only a lower limit of the numerical range may be prescribed or an upper limit and a lower limit of the numerical range may be prescribed. The parameter may be a holding point.

The holding period management unit 730 may be configured to manage the point holding period for each of points given at a plurality of times. The holding period management unit 730 may be configured to manage the point holding period by a First in First out (FIFO) method or a Last In First Out (LIFO) method. The holding period management unit 730 may be configured to manage the point holding period by an average value of holding periods of held points.

In another embodiment, the holding period management unit 730 is configured to manage information about a power supply/demand of the community 102 or a part of the community 102 for at least a part of the point holding period. For example, the holding period management unit 730 manages information about the supply remaining power of the community 102 at the plurality of times at which points are given, for each of the points given at the times. The holding period management unit 730 may be configured to manage information about the supply remaining power of the community 102 at a time when a part of the holding point is consumed.

The holding period management unit 730 may be configured to extract a time period (which may also be referred to as 'pressure time period') in which the supply remaining power of the community 102 meets a preset second condition, as a time period included in the holding period, based on the supply remaining power of the community 102 during the holding period. For a single holding period, a plurality of pressure time periods may be included. Information indicative of a relation between the holding period and one or more pressure time periods included in the holding period may be an example of an index indicative of a degree of pressure of the community 102.

In the present embodiment, the adjustment amount determination unit 740 is configured to determine an adjustment amount for calculating an amount of the holding point of the supplier/demander facility, based on the accumulated point difference relating to the specific supplier/demander facility. The adjustment amount may be a negative amount, zero (0) or a positive amount. The adjustment amount may be an example of a correction amount.

[First Embodiment of Calculation Method of Adjustment Amount]

In the present embodiment, the adjustment amount determination unit 740 is configured to determine an adjustment amount, based on the information about the point holding period. As described above, as the information about the point holding, the information indicative of a point holding period, the information about the power supply/demand during a point holding period, and the like are exemplified.

In one embodiment, the adjustment amount determination unit 740 is configured to determine the adjustment amount, based on a length of the point holding period. For example, the adjustment amount determination unit 740 determines the adjustment amount so that the longer the point holding period is, the smaller the adjustment amount is. The adjustment amount determination unit 740 may be configured to determine the adjustment amount so that the longer the point holding period is, the greater the adjustment amount is. The adjustment amount determination unit 740 may be configured to determine the adjustment amount so that the longer the point holding period is, the smaller the amount of the holding point is.

The relation between the length of the point holding period and the adjustment amount may be constant or vary with time during the point holding period. The relation (for example, an increase state or a decrease state) between the length of the point holding period and the adjustment amount may be determined according to the situation of the power supply/demand of the community 102.

The relation between the length of the point holding period and the adjustment amount may be constant, irrespective of the amount of the holding point, or vary according to the amount of the holding point. The relation between the length of the point holding period and the adjustment amount may be set so that the greater the amount of the holding point is, the greater a change ratio of the adjustment amount to the length of the point holding period is. The relation between the length of the point holding period and the adjustment amount may be set so that the greater the amount of the holding point is, the smaller the change ratio of the adjustment amount to the length of the point holding period is.

In another embodiment, the adjustment amount determination unit 740 is configured to determine the adjustment amount, based on the situation of the power supply/demand of the community 102 during at least a part of the point holding period. The adjustment amount determination unit 740 may be configured to determine the adjustment amount, based on a relation between the point holding period and one or more pressure time periods included in the holding period. For example, the adjustment amount determination unit 740 determines the adjustment amount, based on a ratio (A/B) of a sum (A) of lengths of one or more pressure time periods to a length (B) of the holding period. The adjustment amount determination unit 740 may be configured to determine the adjustment amount so that the greater the ratio is, the greater the adjustment amount is. The adjustment amount determination unit 740 may be configured to determine the adjustment amount so that the greater the ratio is, the smaller the adjustment amount is.

The adjustment amount determination unit 740 may be configured to determine the adjustment amount so that the more the power supply/demand is pressed, the smaller the amount of the holding point after power is received from the outside is. The adjustment amount determination unit 740 may be configured to determine the adjustment amount so that the more the power supply/demand is pressed, the greater the amount of the holding point after power is supplied to the outside is.

[Second Embodiment of Calculation Method of Adjustment Amount]

In the present embodiment, the adjustment amount determination unit 740 is configured to determine the adjustment amount, based on a situation of the power supply/demand of the community 102 at a specific point of time. For example, the adjustment amount determination unit 740 determines the adjustment amount so that the more the power supply/demand of the community 102 is pressed at the specific point of time, the greater the adjustment amount is. The adjustment amount determination unit 740 may be configured to determine the adjustment amount so that the more the power supply/demand of the community 102 is pressed at the specific point of time, the smaller the adjustment amount is.

The specific point of time is not particularly limited. The specific point of time may be a point of time at which the specific supplier/demander facility consumes a point, a point of time designated from the specific supplier/demander facility or a point of time designated from the holding period management unit 730 or the adjustment amount determination unit 740.

[Third Embodiment of Calculation Method of Adjustment Amount]

In the present embodiment, the adjustment amount determination unit 740 is configured to determine the adjustment amount, based on the situation of the power supply/demand of the community 102 at a point of time at which power is supplied to the power transmission and distribution grid 122. For example, the adjustment amount determination unit 740 determines the adjustment amount so that the more the power supply/demand of the community 102 is pressed at a point of time at which power is supplied to the power transmission and distribution grid 122, the greater the adjustment amount is. The adjustment amount determination unit 740 may be configured to determine the adjustment amount so that the more the power supply/demand of the community 102 is pressed at a point of time at which power is supplied to the power transmission and distribution grid 122, the smaller the adjustment amount is.

The adjustment amount determination unit 740 may be configured to determine the adjustment amount for each of powers supplied to the power transmission and distribution grid 122 at a plurality of times by referring to the holding period management unit 730, for example. The adjustment amount determination unit 740 may be configured to determine the adjustment amount by a First in First out (FIFO) method or a Last In First Out (LIFO) method.

In the present embodiment, the point accumulation unit 750 is configured to accumulate points given to each supplier/demander facility and points consumed by each supplier/demander facility, for each of one or more supplier/demander facilities configuring the community 102. The point accumulation unit 750 may be configured to calculate an accumulated point difference of each supplier/demander facility. The accumulated point difference of each supplier/demander facility is obtained by subtracting an accumulated amount of points consumed by each supplier/demander facility from an accumulated amount of points given to each supplier/demander facility.

In the present embodiment, when the specific supplier/demander facility supplies power to the power transmission and distribution grid 122, the point accumulation unit 750 acquires information indicative of the number of points correlating with an amount of power supplied to the power transmission and distribution grid 122 by the supplier/demander facility, from the point conversion unit 654. The number of points may be an example of an amount of points given to the specific supplier/demander facility.

Likewise, when the specific supplier/demander facility receives power from the power transmission and distribution grid 122, the point accumulation unit 750 acquires information indicative of the number of points correlating with an amount of power received from the power transmission and distribution grid 122 by the supplier/demander facility, from the point conversion unit 654. The number of points may be an example of an amount of points consumed by the specific supplier/demander facility.

In the present embodiment, the holding amount determination unit 760 is configured to determine an amount of points held by each of one or more supplier/demander facilities configuring the community 102. The amount of points held by the supplier/demander facility may also be referred to as 'holding point'.

The amount of points held by each supplier/demander facility may be an amount correlating with an amount of power that can be used, profited or disposed by each power supplier/demander. The amount of points held by each supplier/demander facility indicates an amount of points that can be used by each supplier/demander facility. Each supplier/demander facility can use power, which is generated using the surplus power or supply remaining power of the community 102, by consuming the points held by each supplier/demander facility. In the present embodiment, each supplier/demander facility can consume the points within a range of the amount of points held by each supplier/demander facility. The amount of points held by each supplier/demander facility may be an example of an amount of available power correlation.

The holding amount determination unit 760 is configured to determine the amount of points held by the supplier/demander facility, based on (i) an amount of points correlating with an amount of power supplied to the power transmission and distribution grid 122 by a specific supplier/demander facility, and (ii) an amount of points correlating with an amount of power received from the power transmission and distribution grid 122 by the specific supplier/demander facility. More specifically, the holding amount determination unit 760 is configured to determine the amount of points held by the supplier/demander facility, based on an accumulated point difference of a specific supplier/demander facility.

The holding amount determination unit 760 may be configured to determine the amount of points held by the supplier/demander facility, based on (i) an amount of points correlating with an amount of power supplied to the power transmission and distribution grid 122 by a specific supplier/demander facility, (ii) an amount of points correlating with an amount of power received from the power transmission and distribution grid 122 by the specific supplier/demander facility, and (iii) an adjustment amount determined by the adjustment amount determination unit 740. More specifically, the holding amount determination unit 760 is configured to determine the amount of points held by the supplier/demander facility, based on an accumulated point difference of a specific supplier/demander facility and an adjustment amount determined by the adjustment amount determination unit 740. The holding amount determination unit 760 is configured to determine the amount of points held by the supplier/demander facility by summing an accumulated point difference of a specific supplier/demander facility and an adjustment amount determined by the adjustment amount determination unit 740, for example.

Thereby, the holding amount determination unit 760 can determine the holding point, based on the information about the point holding period, for example. The holding amount determination unit 760 may be configured to determine the holding point, based on a situation of a power supply/demand of the community 102 at a specific point of time, for example. The holding amount determination unit 760 may be configured to determine the holding point, based on a situation of a power supply/demand of the community 102 at a point of time at which the supplier/demander facility supplies power to the community 102, for example.

FIG. 8 schematically shows an example of a data table 800. The data table 800 may be an example of a data structure of a database that is managed by the holding period management unit 730. The data table 800 is stored in the storage unit 560, for example.

In the present embodiment, in the data table 800, a community ID 812, a supplier/demander ID 814, information 822 indicative of a time at which power has been transmitted or received, a time period ID 824 for identifying a unit time period to which the power transmission time or power reception time belongs, information 832 indicative of an amount of transmitted power, information 834 indicative of an amount of received power, information 840 indicative of an amount of points given or consumed according to the power transmission or reception, and information 850 indicative of supply remaining power of the community 102 at the power transmission time or power reception time are stored with being associated. Thereby, the holding period management unit 730 can manage an amount of points given or consumed at a plurality of times. The holding period management unit 730 can implement management of First in First out method or Last In First Out method by using the data table 800, for example.

The unit time period to which the power transmission time or power reception time belongs is used for easy calculation of the point holding period. A length of the unit time period to which the power transmission time or power reception time belongs may be the same as or different from a length of a unit time period that is used for balance adjustment of the power supply/demand. For example, the length of the unit time period to which the power transmission time or power reception time belongs is one month, 3 months, 6 months or one year, and the length of the unit time period that is used for balance adjustment of the power supply/demand is 15 minutes, 30 minutes or one hour.

FIG. 9 schematically shows an example of a data table 900. The data table 900 may be an example of a data structure of a database that is managed by the billing management unit 640. The data table 900 may be an example of a data table indicative of revenues associated with power supplied to an outside by a supplier/demander facility. The data table 900 is stored in the storage unit 560, for example.

In the present embodiment, in the data table 900, a community ID 922, a supplier/demander ID 924, information 930 indicative of a time (which may also be referred to as 'power transmission time') at which power is supplied to the power transmission and distribution grid 122 by the supplier/demander facility, information 940 about an amount of transmitted power at the power transmission time, and revenue-related information 950 of a supplier/demander facility at the power transmission time are stored with being associated. The information 940 about an amount of transmitted power may include information 942 indicative of a sum of amounts of transmitted power during a power transmission time period, and breakdown-related information 944. The breakdown-related information 944 may include information 946 indicative of an amount of power selling and information 948 indicative of an amount of power converted into points. The revenue-related information 950 may include money amount-related information 952, and given point amount-related information 954.

FIG. 10 schematically shows an example of a data table 1000. The data table 1000 may be an example of a data structure of a database that is managed by the billing management unit 640. The data table 1000 may be an example of a data table indicative of expenditures associated with power received from an outside by a supplier/demander facility. The data table 1000 is stored in the storage unit 560, for example.

In the present embodiment, in the data table 1000, a community ID 1022, a supplier/demander ID 1024, information 1030 indicative of a time (which may also be referred to as 'power reception time') at which power is received from the power transmission and distribution grid 122 by the supplier/demander facility, information 1040 about an amount of received power at the power reception time, and expenditure-related information 1050 of a supplier/demander facility at the power reception time are stored with being associated. The information 1040 about an amount of received power may include information 1042 indicative of a sum of amounts of received power during a power reception time period, and breakdown-related information 1044. The breakdown-related information 1044 may include information 1046 indicative of an amount of power purchase and information 1048 indicative of an amount of power converted into points. The expenditure-related information 1050 may include money amount-related information 1052, and consumed point amount-related information 954.

Figure 11:
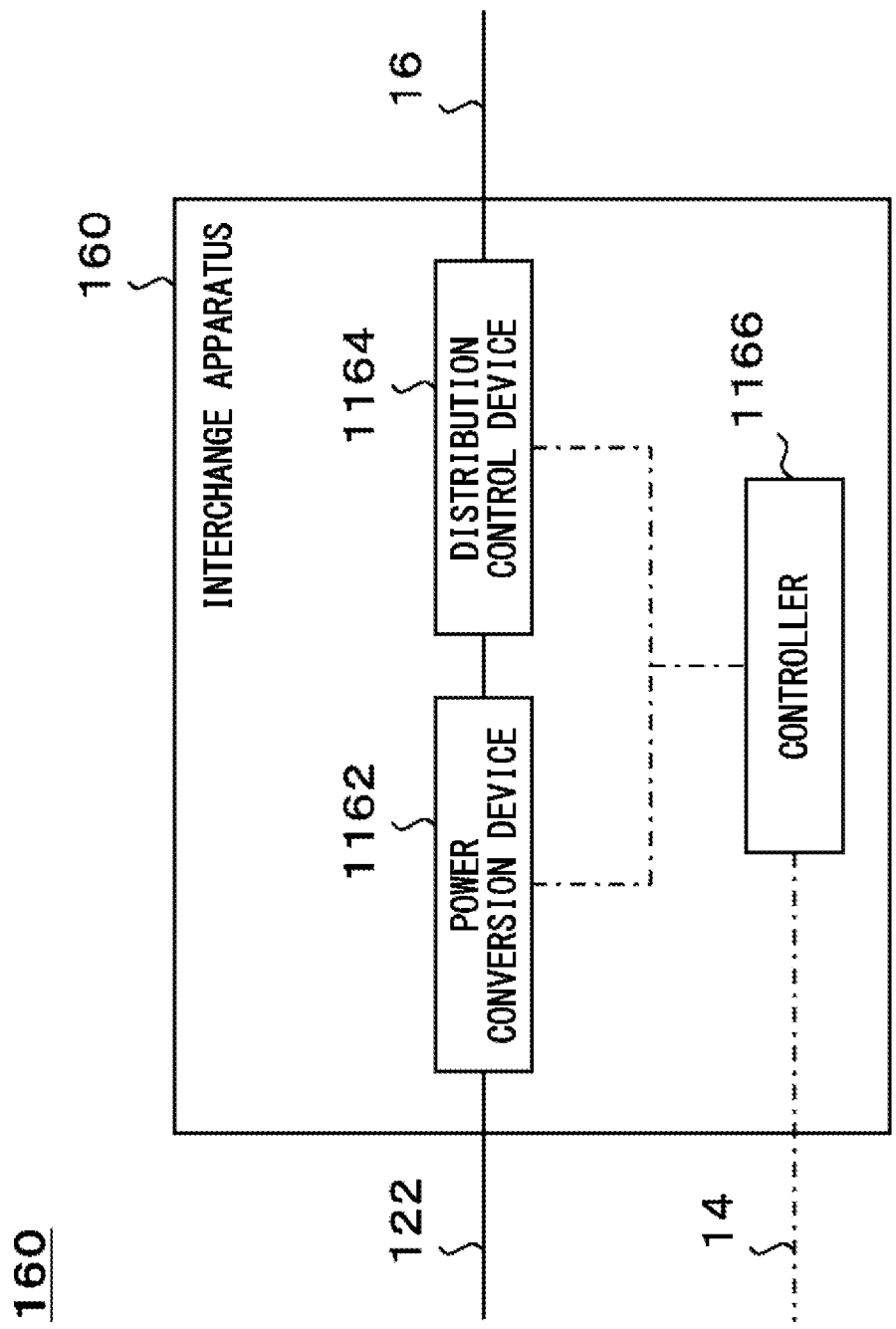
FIG. 11 schematically shows an example of an internal configuration of an interchange apparatus 160.

FIG. 11 schematically shows an example of an internal configuration of the interchange apparatus 160. In the present embodiment, the interchange apparatus 160 includes a power conversion device 1162, a distribution control device 1164, and a controller 1166.

In the present embodiment, the power conversion device 1162 is configured to convert direct current into alternating current or alternating current into direct current under control of the controller 1166. The power conversion device 1162 is configured to convert a quality of electricity under control of the controller 1166. In one embodiment, the power conversion device 1162 is configured to convert at least one of a voltage and a frequency of electricity to flow through the power transmission and distribution grid 122, and to supply the converted electricity to the self-owned line 16 via the distribution control device 1164. In another embodiment, the power conversion device 1162 is configured to convert at least one of a voltage and a frequency of electricity to flow through the self-owned line 16, and to supply the converted electricity to the power transmission and distribution grid 122 via the distribution control device 1164.

In the present embodiment, the distribution control device 1164 is configured to control distribution of electricity under control of the controller 1166. In one embodiment, the distribution control device 1164 is configured to cause current to pass from the power transmission and distribution grid 122 toward the self-owned line 16. In another embodiment, the distribution control device 1164 is configured to cause current to pass from the self-owned line 16 toward the system power grid 12. Also, in another embodiment, the distribution control device 1164 is configured to control an amount of electricity to be distributed.

In the present embodiment, the controller 1166 is configured to control electricity to be interchanged between the power transmission and distribution grid 122 and the self-owned line 16. In one embodiment, the controller 1166 is configured to control a type and a quality of electricity to be interchanged. In another embodiment, the controller 1166 is configured to control a distribution direction and an amount of electricity. The controller 1166 may be configured to control at least one of the power conversion device 1162 and the distribution control device 1164, in response to an instruction from the community management server 440.

Figure 12:
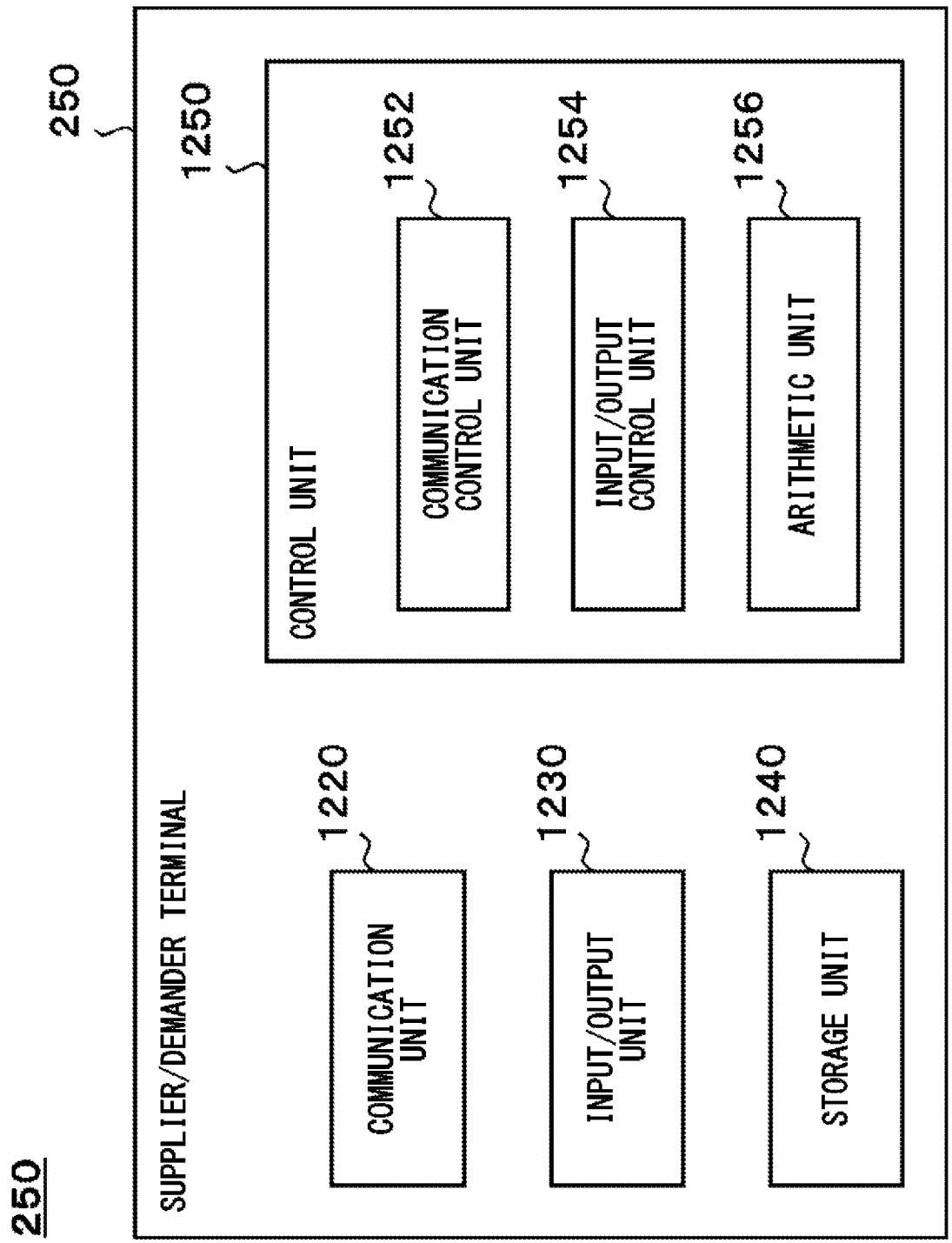
FIG. 12 schematically shows an example of an internal configuration of a supplier/demander terminal 250.

FIG. 12 schematically shows an example of an internal configuration of the supplier/demander terminal 250. In the present embodiment, the supplier/demander terminal 250 includes a communication unit 1220, an input/output unit 1230, a storage unit 1240, and a control unit 1250. In the present embodiment, the control unit 1250 includes a communication control unit 1252, an input/output control unit 1254, and an arithmetic unit 1256.

In the present embodiment, the communication unit 1220 is configured to transmit and receive information to and from an external communication device. In the present embodiment, the input/output unit 1230 is configured to function as a user interface. The input/output unit 1230 is configured to receive an input from a user. The input/output unit 1230 is configured to output information to a user. In the present embodiment, the storage unit 1240 is configured to store a variety of information. The storage unit 1240 is configured to store various types of data, various types of programs, and the like. In the present embodiment, the control unit 1250 is configured to control operations of the supplier/demander terminal 250. The control unit 1250 may be configured to execute a variety of information processing.

In the present embodiment, the communication control unit 1252 is configured to control the communication unit 1220. The communication control unit 1252 may be various types of communication interfaces. The input/output control unit 1254 is configured to control the input/output unit 1230. The arithmetic unit 1256 is configured to execute a variety of information processing. The arithmetic unit 1256 may be configured to execute a variety of information processing, thereby controlling the supplier/demander terminal 250 and an external device.

For example, the arithmetic unit 1256 may execute at least a part of the information processing in the community management server 440. Thereby, at least a part of the functions of the community management server 440 is implemented by the arithmetic unit 1256. In this case, the supplier/demander terminal 250 may be an example of a power information management system or a power information management server.

While the embodiments of the present invention have been described, the technical scope of the invention is not limited to the above described embodiments. It is apparent to persons skilled in the art that various alterations and improvements can be added to the above-described embodiments. Also, the matters described in the specific embodiment can be applied to other embodiments inasmuch as there is no technical inconsistency. It is also apparent from the scope of the billings that the embodiments added with such alterations or improvements can be included in the technical scope of the invention.

The operations, procedures, steps, and stages of each process performed by an apparatus, system, program, and method shown in the billings, embodiments, or diagrams can be performed in any order as long as the order is not indicated by "prior to," "before," or the like and as long as the output from a previous process is not used in a later process. Even if the process flow is described using phrases such as "first" or "next" in the billings, embodiments, or diagrams, it does not necessarily mean that the process must be performed in this order.

EXPLANATION OF REFERENCES

12: system power grid, 14: communication network, 16: self-owned line, 22: electric automobile, 24: storage battery, 100: energy management system, 102: community, 104: community, 106: community, 112: supplier/demander facility, 114: supplier/demander facility, 120: electric substation apparatus, 122: power transmission and distribution grid, 140: energy management apparatus, 160: interchange apparatus, 180: wide-area management server, 210: power load, 220: power supply apparatus, 222: power generation device, 224: power storage device, 230: power distribution apparatus, 240: controller, 250: supplier/demander terminal, 320: communication control unit, 332: supply/demand monitoring unit, 334: supply/demand prediction unit, 336: supply/demand adjustment unit, 350: request processing unit, 440: community management server, 520: communication control unit, 530: data collection unit, 540: supply/demand management unit, 552: supplier/demander facility control unit, 554: community apparatus control unit, 560: storage unit, 620: request processing unit, 630: system control unit, 640: billing management unit, 650: point management unit, 652: power-amount acquisition unit, 654: point conversion unit, 656: holding amount management unit, 720: supply/demand information acquisition unit, 730: holding period management unit, 740: adjustment amount determination unit, 750: point accumulation unit, 760: holding amount determination unit, 800: data table, 812: community ID, 814: supplier/demander ID, 822 information, 824: time period ID, 832: information, 834: information, 840: information, 850: information, 900: data table, 922: community ID, 924: supplier/demander ID, 930: information, 940: information, 942: information, 944: information, 946: information, 948: information, 950: information, 952: information, 954: information, 1000: data table, 1022: community ID, 1024: supplier/demander ID, 1030: information, 1040: information, 1042: information, 1044: information, 1046: information, 1048: information, 1050: information, 1052: information, 1054: information, 1162: power conversion device, 1164: distribution control device, 1166: controller, 1220: communication unit, 1230: input/output unit, 1240: storage unit, 1250 control unit, 1252: communication control unit, 1254: input/output control unit, 1256: arithmetic unit

What is claimed is:

1. A power information management system comprising:
   a supply information acquisition unit configured to acquire an amount of supplied power correlation correlating with an amount of externally-supplied power, which is an amount of power supplied to an external by a power supplier/demander having at least one of a power generation apparatus and a power storage apparatus;
   a receipt information acquisition unit configured to acquire an amount of received power correlation correlating with an amount of externally-received power, which is an amount of power received from an external by the power supplier/demander; and
   an available amount determination unit configured to determine an amount of available power correlation that can be available by the power supplier/demander, the amount of available power correlation correlating with an amount of power that can be used, profited or disposed by the power supplier/demander,
   wherein the available amount determination unit is configured to determine the amount of available power correlation at a specific point of time, based on (A) the amount of supplied power correlation, (B) the amount of received power correlation, and (C) information about an elapsed time period from (i) a point of time at which the power supplier/demander supplies power to an external, or (ii) a point of time at which a difference between the amount of supplied power correlation and the amount of received power correlation meets a preset first condition to the specific point of time.

2. The power information management system according to claim 1, wherein
   the amount of externally-supplied power is an amount of power equivalent to an amount of power, which is to be received by a power storage apparatus disposed outside the power supplier/demander, as the amount of power to be supplied to the external by the power supplier/demander, and
   the amount of externally-received power is an amount of power equivalent to an amount of power, which is to be supplied from a power storage apparatus disposed outside the power supplier/demander, as the amount of power to be received from the external by the power supplier/demander.

3. The power information management system according to claim 1, further comprising:
   a receipt permission unit configured to determine whether to permit the power supplier/demander to receive power from an external,
   wherein the receipt permission unit is configured to permit receiving the power from the external within a range of the amount of available power correlation.

4. The power information management system according to claim 1, wherein the available amount determination unit is configured to determine the amount of available power correlation, based on (D) an amount obtained by subtracting the amount of received power correlation from the amount of supplied power correlation, and (E) a correction amount to be determined based on the information about the elapsed time period.

5. The power information management system according to claim 4, wherein
   the available amount determination unit comprises a correction amount determination unit configured to determine the correction amount, and the correction amount determination unit is configured to determine the correction amount so that longer the elapsed time period is, smaller a corrected amount of available power correlation is.

6. The power information management system according to claim 4, wherein
the available amount determination unit comprises:
a correction amount determination unit configured to determine the correction amount, and
a supply/demand situation acquisition unit configured to acquire information about a situation of a power supply/demand, and
the correction amount determination unit is configured to determine the correction amount, based on the information about the situation of the power supply/demand acquired for the elapsed time period by the supply/demand situation acquisition unit.

7. The power information management system according to claim 6, wherein
the supply/demand situation acquisition unit is configured to acquire information about a situation of the power supply/demand of a community to which the power supplier/demander belongs, and
the available amount determination unit is configured to determine the correction amount, based on a degree of the community's pressure for the power supply/demand during the elapsed time period.

8. A power information management system comprising:
a supply information acquisition unit configured to acquire an amount of supplied power correlation correlating with an amount of externally-supplied power, which is an amount of power supplied to an external by a power supplier/demander having at least one of a power generation apparatus and a power storage apparatus;
a receipt information acquisition unit configured to acquire an amount of received power correlation correlating with an amount of externally-received power, which is an amount of power received from an external by the power supplier/demander;
a supply/demand situation acquisition unit configured to acquire information about a situation of a power supply/demand; and
an available amount determination unit configured to determine an amount of available power correlation that can be available by the power supplier/demander, the amount of available power correlation correlating with an amount of power that can be used, profited or disposed by the power supplier/demander,
wherein the available amount determination unit is configured to determine the amount of available power correlation at a specific point of time, based on (A) the amount of supplied power correlation, (B) the amount of received power correlation, and (F) the information about the situation of the power supply/demand at the specific point of time, which is acquired by the supply/demand situation acquisition unit.

9. The power information management system according to claim 8, wherein
the available amount determination unit comprises:
a correction amount determination unit configured to determine a correction amount of the amount of available power correlation, based on the information about the situation of the power supply/demand at the specific point of time, and
a correction unit configured to determine the amount of available power correlation, based on the correction amount and an amount obtained by subtracting the amount of received power correlation from the amount of supplied power correlation.

10. A power information management system comprising:
a supply information acquisition unit configured to acquire an amount of supplied power correlation correlating with an amount of externally-supplied power, which is an amount of power supplied to an external by a power supplier/demander having at least one of a power generation apparatus and a power storage apparatus;
a receipt information acquisition unit configured to acquire an amount of received power correlation correlating with an amount of externally-received power, which is an amount of power received from an external by the power supplier/demander;
a supply/demand situation acquisition unit configured to acquire information about a situation of a power supply/demand; and
an available amount determination unit configured to determine an amount of available power correlation that can be available by the power supplier/demander, the amount of available power correlation correlating with an amount of power that can be used, profited or disposed by the power supplier/demander,
wherein the available amount determination unit is configured to determine the amount of available power correlation, based on (A) the amount of supplied power correlation, (B) the amount of received power correlation, and (G) the information about the situation of the power supply/demand at a point of time at which the power supplier/demander supplies power to an external, the information being acquired by the supply/demand situation acquisition unit.

11. The power information management system according to claim 10, wherein
the available amount determination unit comprises:
a correction amount determination unit configured to determine a correction amount of the amount of available power correlation, based on the information about the situation of the power supply/demand at a specific point of time at which the power supplier/demander supplies power to an external, and
a correction unit configured to determine the amount of available power correlation, based on the correction amount and an amount obtained by subtracting the amount of received power correlation from the amount of supplied power correlation.

12. The power information management system according to claim 9, wherein
the correction unit is configured to determine an amount of power correlation, which can be available by the power supplier/demander, by summing the correction amount and an amount obtained by subtracting the amount of received power correlation from the amount of supplied power correlation, and
the correction amount determination unit is configured to determine the correction amount so that more the power supply/demand is pressed, smaller a corrected amount of available power correlation is.

13. A power information management method comprising:
supply information acquiring of acquiring an amount of supplied power correlation correlating with an amount of externally-supplied power, which is an amount of power supplied to an external by a power supplier/ demander having at least one of a power generation apparatus and a power storage apparatus;

receipt information acquiring of acquiring an amount of received power correlation correlating with an amount of externally-received power, which is an amount of power received from an external by the power supplier/demander; and available amount determining of determining an amount of available power correlation that can be available by the power supplier/demander, the amount of available power correlation correlating with an amount of power that can be used, profited or disposed by the power supplier/demander, wherein the available amount determining comprises determining the amount of available power correlation at a specific point of time, based on (A) the amount of supplied power correlation, (B) the amount of received power correlation, and (C) information about an elapsed time period from (i) a point of time at which the power supplier/demander supplies power to an external, or (ii) a point of time at which a difference between the amount of supplied power correlation and the amount of received power correlation meets a preset first condition to the specific point of time.

14. A non-transitory, computer-readable recording medium having recorded thereon a program that causes a computer to execute:

supply information acquiring of acquiring an amount of supplied power correlation correlating with an amount of externally-supplied power, which is an amount of power supplied to an external by a power supplier/demander having at least one of a power generation apparatus and a power storage apparatus;

receipt information acquiring of acquiring an amount of received power correlation correlating with an amount of externally-received power, which is an amount of power received from an external by the power supplier/demander; and available amount determining of determining an amount of available power correlation that can be available by the power supplier/demander, the amount of available power correlation correlating with an amount of power that can be used, profited or disposed by the power supplier/demander, wherein the available amount determining comprises determining the amount of available power correlation at a specific point of time, based on (A) the amount of supplied power correlation, (B) the amount of received power correlation, and (C) information about an elapsed time period from (i) a point of time at which the power supplier/demander supplies power to an external, or (ii) a point of time at which a difference between the amount of supplied power correlation and the amount of received power correlation meets a preset first condition to the specific point of time.

15. A power information management server comprising:

a supply information acquisition unit configured to acquire an amount of supplied power correlation correlating with an amount of externally-supplied power, which is an amount of power supplied to an external by a power supplier/demander having at least one of a power generation apparatus and a power storage apparatus;

a receipt information acquisition unit configured to acquire an amount of received power correlation correlating with an amount of externally-received power, which is an amount of power received from an external by the power supplier/demander; and an available amount determination unit configured to determine an amount of available power correlation that can be available by the power supplier/demander, the amount of available power correlation correlating with an amount of power that can be used, profited or disposed by the power supplier/demander, wherein the available amount determination unit is configured to determine the amount of available power correlation at a specific point of time, based on (A) the amount of supplied power correlation, (B) the amount of received power correlation, and (C) information about an elapsed time period from (i) a point of time at which the power supplier/demander supplies power to an external, or (ii) a point of time at which a difference between the amount of supplied power correlation and the amount of received power correlation meets a preset first condition to the specific point of time.

16. A communication terminal to be used by a power supplier/demander having at least one of a power generation apparatus and a power storage apparatus, the communication terminal comprising:

a supply information acquisition unit configured to acquire an amount of supplied power correlation correlating with an amount of externally-supplied power, which is an amount of power supplied to an external by the power supplier/demander;

a receipt information acquisition unit configured to acquire an amount of received power correlation correlating with an amount of externally-received power, which is an amount of power received from an external by the power supplier/demander; and an available amount determination unit configured to determine an amount of available power correlation that can be available by the power supplier/demander, the amount of available power correlation correlating with an amount of power that can be used, profited or disposed by the power supplier/demander, wherein the available amount determination unit is configured to determine the amount of available power correlation at a specific point of time, based on (A) the amount of supplied power correlation, (B) the amount of received power correlation, and (C) information about an elapsed time period from (i) a point of time at which the power supplier/demander supplies power to an external, or (ii) a point of time at which a difference between the amount of supplied power correlation and the amount of received power correlation meets a preset first condition to the specific point of time.

17. A power system comprising:

the power information management system according to claim 1, and a power supply system in which at least two of a plurality of the power generation apparatuses and a plurality of the power storage apparatuses disposed in each of a plurality of power suppliers/demanders are electrically connected, wherein the supply information acquisition unit in the power information management system is configured to acquire an amount of supplied power correlation correlating with an amount of power supplied to the power supply system by each power supplier/demander, for each of the plurality of power suppliers/demanders, the receipt information acquisition unit in the power information management system is configured to acquire an amount of received power correlation correlating with an amount of power received from the power supply system by each power supplier/demander, for each of the plurality of power suppliers/demanders, and the available amount determination unit in the power information management system is configured to determine an amount of available power correlation of each power supplier/demander, based on the amount of supplied power correlation and the amount of received power correlation of each power supplier/demander, for each of the plurality of power suppliers/demanders.

18. The power system according to claim 17, comprising:

a request acquisition unit configured to acquire information indicating that one of the plurality of power suppliers/demanders wants to receive power from the power supply system, and a power transmission/reception control unit configured to control transmission/reception of power between the power supply system and each of the plurality of power suppliers/demanders, wherein the power transmission/reception control unit is configured to permit power transmission from the power supply system to the one of the plurality of power suppliers/demanders within a range of an amount of power correlating with the amount of available power correlation of the one of the plurality of power suppliers/demanders.

19. The power information management system according to claim 11, wherein the correction unit is configured to determine an amount of power correlation, which can be available by the power supplier/demander, by summing the correction amount and an amount obtained by subtracting the amount of received power correlation from the amount of supplied power correlation, and the correction amount determination unit is configured to determine the correction amount so that more the power supply/demand is pressed, smaller a corrected amount of available power correlation is.

* * * * *